United States Patent
Izard et al.

(10) Patent No.: US 10,419,327 B2
(45) Date of Patent: Sep. 17, 2019

(54) SYSTEMS AND METHODS FOR CONTROLLING SWITCHES TO RECORD NETWORK PACKETS USING A TRAFFIC MONITORING NETWORK

(71) Applicant: Big Switch Networks, Inc., Santa Clara, CA (US)

(72) Inventors: Ryan Izard, San Jose, CA (US); Robert Ling, San Jose, CA (US); Shudong Zhou, Fremont, CA (US); Sandip Shah, Milpitas, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 28 days.

(21) Appl. No.: 15/782,735

(22) Filed: Oct. 12, 2017

(65) Prior Publication Data
US 2019/0116111 A1    Apr. 18, 2019

(51) Int. Cl.
*H04L 12/751*    (2013.01)
*H04L 12/741*    (2013.01)
(Continued)

(52) U.S. Cl.
CPC ............. *H04L 45/02* (2013.01); *H04L 43/04* (2013.01); *H04L 43/12* (2013.01); *H04L 45/24* (2013.01); *H04L 45/745* (2013.01)

(58) Field of Classification Search
CPC ................................................ H04L 43/00–50
See application file for complete search history.

(56) References Cited

U.S. PATENT DOCUMENTS 6,674,756 B1    1/2004    Rao et al.
7,529,180 B1    5/2009    Karl et al.
(Continued)

FOREIGN PATENT DOCUMENTS

EP    1289191    3/2003
EP    2482496    8/2012
(Continued)

OTHER PUBLICATIONS

Pfaff et al., OpenFlow Switch Specification, Dec. 31, 2009, 42 pages.
Mehta et al., U.S. Appl. No. 14/661,336, filed Mar. 18, 2015.

*Primary Examiner* — Robert C Scheibel
(74) *Attorney, Agent, or Firm* — Treyz Law Group, P.C.; Michael H. Lyons; Tianya He

(57) ABSTRACT

A packet forwarding network may include switches that forward network packets between end hosts. A monitoring network may be coupled to the forwarding network. A controller may control switches in the monitoring network to forward network packets tapped from the forwarding network to one or more packet recorders. The packet recorders may store the tapped packets and the controller may query the stored packets at a later time. The controller may analyze queried packets to monitor the operation of the packet forwarding network and, if desired, to display graphical visualizations associated with the packet forwarding network. If desired, the controller may instruct the packet recorders to replay the tapped packets to network visibility tools through the monitoring network. The controller may coordinate storage and query operations across multiple packet recorders using the monitoring network so that the packet storage capacity and recording rate may be scaled up over time.

20 Claims, 20 Drawing Sheets

(51) Int. Cl.
*H04L 12/707* (2013.01)
*H04L 12/26* (2006.01)

(56) References Cited

U.S. PATENT DOCUMENTS

| | | | |
|---|---|---|---|
| 7,577,098 B2 | 8/2009 | Tamura et al. | |
| 7,710,867 B1 | 5/2010 | Masters | |
| 8,098,572 B2 | 1/2012 | Zhou et al. | |
| 8,300,523 B2 | 10/2012 | Salam et al. | |
| 8,321,555 B2 | 11/2012 | Gunther | |
| 8,321,938 B2 | 11/2012 | Strayer et al. | |
| 8,565,108 B1 | 10/2013 | Marshall et al. | |
| 8,566,649 B1 | 10/2013 | Bishara | |
| 8,576,840 B2 | 11/2013 | Larsen et al. | |
| 8,650,618 B2 | 2/2014 | Asati et al. | |
| 8,660,129 B1 | 2/2014 | Brendel et al. | |
| 8,665,699 B2 | 3/2014 | Bellagamba et al. | |
| 8,804,748 B2 | 8/2014 | Jia et al. | |
| 8,812,726 B2 | 8/2014 | Khalid et al. | |
| 8,819,235 B2 | 8/2014 | Cardona et al. | |
| 9,008,080 B1* | 4/2015 | Mehta | H04L 49/60 370/327 |
| 9,014,184 B2 | 4/2015 | Iwata et al. | |
| 9,184,995 B2 | 11/2015 | Leong | |
| 9,548,896 B2 | 1/2017 | Naiksatam et al. | |
| 9,787,567 B1 | 10/2017 | Mehta et al. | |
| 9,954,751 B2* | 4/2018 | Zhang | H04L 43/0823 |
| 9,971,619 B2* | 5/2018 | Karnes | H04L 43/12 |
| 2002/0131369 A1 | 9/2002 | Hasegawa et al. | |
| 2003/0105881 A1 | 6/2003 | Symons et al. | |
| 2003/0208618 A1 | 11/2003 | Mor et al. | |
| 2003/0214913 A1* | 11/2003 | Kan | H04L 43/08 370/252 |
| 2004/0003094 A1 | 1/2004 | See | |
| 2004/0013120 A1 | 1/2004 | Shen | |
| 2004/0139236 A1 | 7/2004 | Mehra et al. | |
| 2006/0031374 A1 | 2/2006 | Lu et al. | |
| 2006/0059163 A1 | 3/2006 | Frattura et al. | |
| 2006/0098589 A1 | 5/2006 | Kreeger et al. | |
| 2006/0209699 A1 | 9/2006 | Tamura et al. | |
| 2006/0218404 A1 | 9/2006 | Ogura | |
| 2007/0295395 A1 | 12/2007 | Phillips et al. | |
| 2008/0002719 A1* | 1/2008 | Byrd | H04L 43/18 370/395.52 |
| 2008/0189769 A1 | 8/2008 | Casado et al. | |
| 2008/0198849 A1 | 8/2008 | Guichard et al. | |
| 2009/0080338 A1 | 3/2009 | Parker | |
| 2009/0097418 A1 | 4/2009 | Castillo | |
| 2010/0020680 A1 | 1/2010 | Salam et al. | |
| 2010/0080226 A1 | 4/2010 | Khalid et al. | |
| 2010/0242093 A1 | 9/2010 | Zuk et al. | |
| 2010/0254385 A1 | 10/2010 | Sharma et al. | |
| 2010/0315943 A1 | 12/2010 | Chao et al. | |
| 2011/0087979 A1* | 4/2011 | Breslin | H04L 41/0816 715/764 |
| 2011/0116378 A1 | 5/2011 | Ramankutty et al. | |
| 2011/0125748 A1* | 5/2011 | Wood | H04L 43/026 707/737 |
| 2011/0161521 A1 | 6/2011 | McDysan et al. | |
| 2011/0206064 A1* | 8/2011 | Head | H04L 69/22 370/474 |
| 2011/0268125 A1 | 11/2011 | Vobbilisetty et al. | |
| 2012/0051229 A1 | 3/2012 | Feldmann et al. | |
| 2012/0250679 A1 | 10/2012 | Judge | |
| 2012/0278477 A1 | 11/2012 | Terrell et al. | |
| 2012/0281540 A1 | 11/2012 | Khan et al. | |
| 2013/0010600 A1 | 1/2013 | Jocha et al. | |
| 2013/0022767 A1 | 1/2013 | Klafke et al. | |
| 2013/0028072 A1 | 1/2013 | Addanki | |
| 2013/0058354 A1 | 3/2013 | Casado et al. | |
| 2013/0070608 A1 | 3/2013 | McCanne et al. | |
| 2013/0070762 A1 | 3/2013 | Adams et al. | |
| 2013/0073743 A1 | 3/2013 | Ramasamy et al. | |
| 2013/0227670 A1 | 4/2013 | Ahmad et al. | |
| 2013/0215769 A1 | 8/2013 | Beheshti-Zavareh et al. | |
| 2013/0242998 A1 | 9/2013 | Deshpande | |
| 2013/0265886 A1* | 10/2013 | Leong | H04L 43/10 370/250 |
| 2014/0036924 A1 | 2/2014 | Christenson | |
| 2014/0149569 A1 | 5/2014 | Wittenstein et al. | |
| 2014/0198649 A1 | 7/2014 | Jain et al. | |
| 2014/0280737 A1* | 9/2014 | Bicket | H04L 67/02 709/218 |
| 2014/0321459 A1 | 10/2014 | Kumar et al. | |
| 2015/0085694 A1* | 3/2015 | Agarwal | H04L 43/04 370/253 |
| 2016/0020939 A1 | 1/2016 | Ramasubramanian et al. | |
| 2016/0021032 A1 | 1/2016 | Maier et al. | |
| 2016/0112287 A1* | 4/2016 | Farmer | H04L 43/106 709/224 |
| 2016/0197836 A1 | 7/2016 | Hussain et al. | |
| 2016/0234091 A1 | 8/2016 | Emmadi et al. | |
| 2016/0269482 A1* | 9/2016 | Jamjoom | H04L 67/1095 |
| 2017/0230260 A1* | 8/2017 | Gueta | H04L 43/08 |
| 2017/0373953 A1* | 12/2017 | George | H04L 63/306 |

FOREIGN PATENT DOCUMENTS

| | | |
|---|---|---|
| EP | 2621136 | 7/2013 |
| EP | 2629464 | 8/2013 |
| WO | 01/63838 | 8/2001 |
| WO | 2013118873 | 8/2013 |
| WO | 2013138977 | 9/2013 |

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * |  | SEND TO PORT 3 |
| * | * | * | * | 172.12.3.4 | * | * | ... | SEND TO PORT 4 |
| * | * | * | * | * | * | 80 |  | DROP |

FIG. 6B

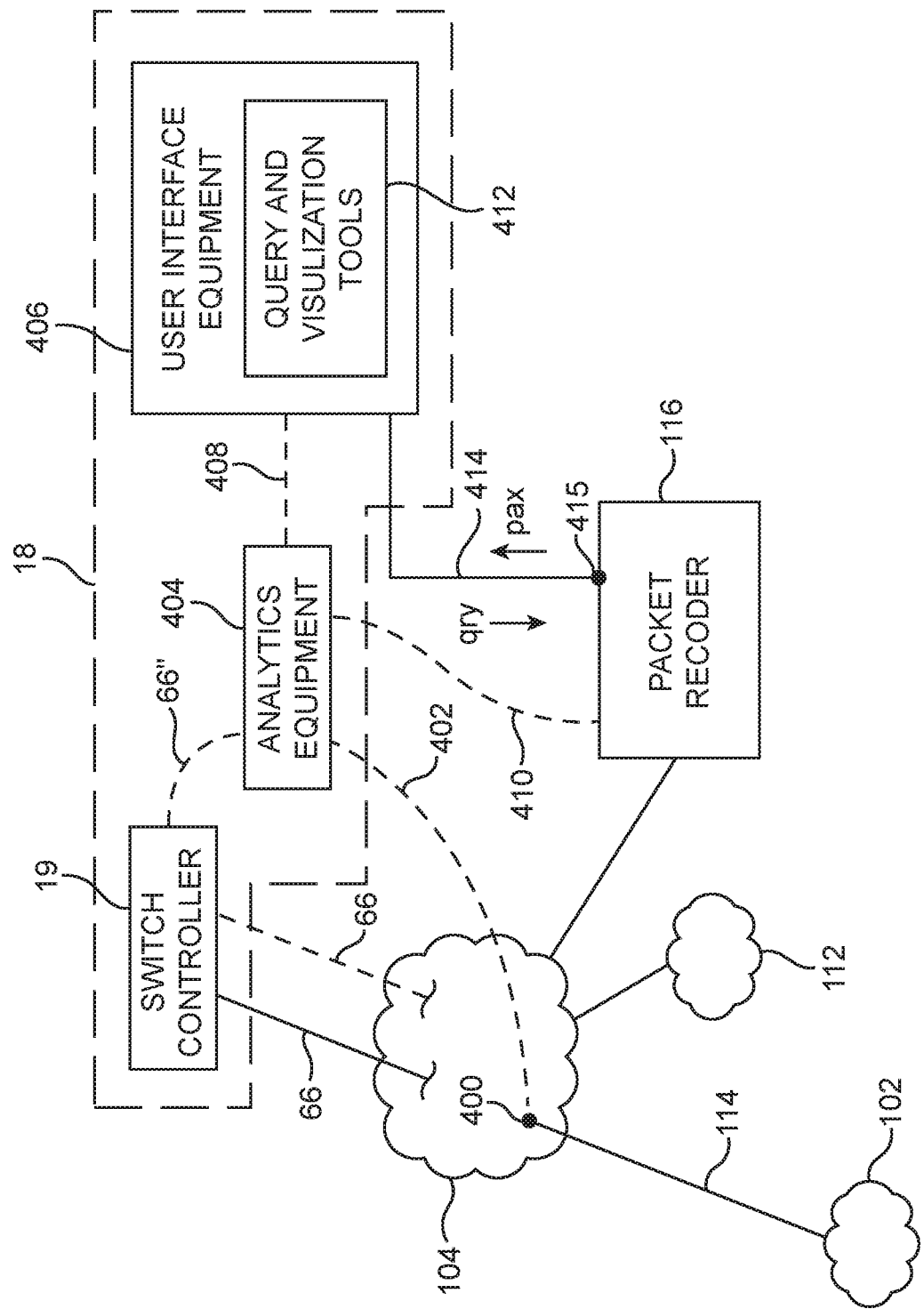

SYSTEMS AND METHODS FOR CONTROLLING SWITCHES TO RECORD NETWORK PACKETS USING A TRAFFIC MONITORING NETWORK

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It is often desirable to monitor network traffic that flows through a network. Conventional network monitoring often utilizes one or more network taps that are interposed between switches of the network. The network tap includes a monitor port that is directly coupled to a monitoring device and copies network traffic that flows between the switches of the network. The copied network traffic is provided to the monitoring device via the monitor port. However, it can be challenging to monitor networks using such arrangements as the networks increase in size and complexity. For example, in order to monitor network traffic at multiple network locations, network taps and corresponding monitoring devices must be provided at each of the network locations, which increases cost and leads to inefficient use of network monitoring resources.

It may therefore be desirable to be able to provide a network with improved network traffic monitoring capabilities.

SUMMARY

A packet forwarding network may include switches that forward network traffic between end hosts that are coupled to the packet forwarding network. A monitoring network that is not used to forward network traffic between end hosts of the packet forwarding network may have network interfaces that are coupled to the packet forwarding network. The network interfaces of the monitoring network may receive tapped (copied or mirrored) network traffic from the packet forwarding network (sometimes referred to herein as a production network). A controller may be used to control client switches in the monitoring network to forward the tapped network packets along desired network paths.

The controller may receive a packet recording policy that identifies a set of the tapped network packets to be recorded. Recorded packets may be stored at packet recorders coupled to the monitoring network and may be retrieved at a later time as necessary to analyze the past performance of the packet forwarding network. The controller may generate network paths that forward the set of tapped network packets from the network interfaces to one or more packet recorders through the client switches in the monitoring network for storage at the packet recorders. The controller (e.g., an analytics engine or query and visualization tools associated with the controller) may query a subset of the set of tapped network packets stored at the packet recorders over control paths.

In one suitable arrangement, the controller may receive the queried subset of the set of tapped network packets stored at the packet recorders over the control paths. The controller may subsequently analyze the queried packets to monitor the operation of the packet forwarding network and, if desired, may display graphical visualizations (e.g., using display equipment) associated with the packet forwarding network to a network administrator. In another suitable arrangement, the controller may instruct the packet recorders to replay the subset of the set of tapped network packets into the monitoring network in the same manner (e.g., with the same timing) with which the tapped packets were received by the monitoring network and recorded at the packet recorders (e.g., based on timestamp information associated with the network packets). In this arrangement, the controller may control the client switches to route the replayed packets to one or more network visibility tools. The network visibility tools may monitor the past performance of the packet forwarding network based on the replayed packets.

If desired, one or more of the packet recorders and/or one or more of the network visibility tools may be implemented on virtual machines running on a cloud computing network. The virtual machines may interface with the monitoring network over network tunnels, for example. If desired, the same equipment may be used to both query desired packets and to generate visualizations associated with the queried packets received from the packet recorders.

When configured in this way, the packet storage capacity and packet recording rate of the monitoring network may be scaled up over time as needed and the controller may autonomously update network topology information to track each of the packet recorders. By logically grouping each of the packet recorders and coalescing recorded packet queries from multiple packet recorders, the controller may allow a network administrator to easily configure the monitoring network and to monitor the packet forwarding network without needing to program and interact with each packet recorder individually, even as the scale of the monitoring network and its corresponding packet storage capacity increases over time.

BRIEF DESCRIPTION OF THE DRAWINGS

FIG. 6B is a diagram of an illustrative forwarding flow table of the type that may be used by a packet processing system showing three illustrative types of packet forwarding that may be performed based on the flow table entries of the flow table in accordance with an embodiment.

FIG. 19 is a diagram showing how query and visualization tools may be used to retrieve packets from a packet recorder using a query and management port on the packet recorder and to display query results to a user in accordance with an embodiment.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
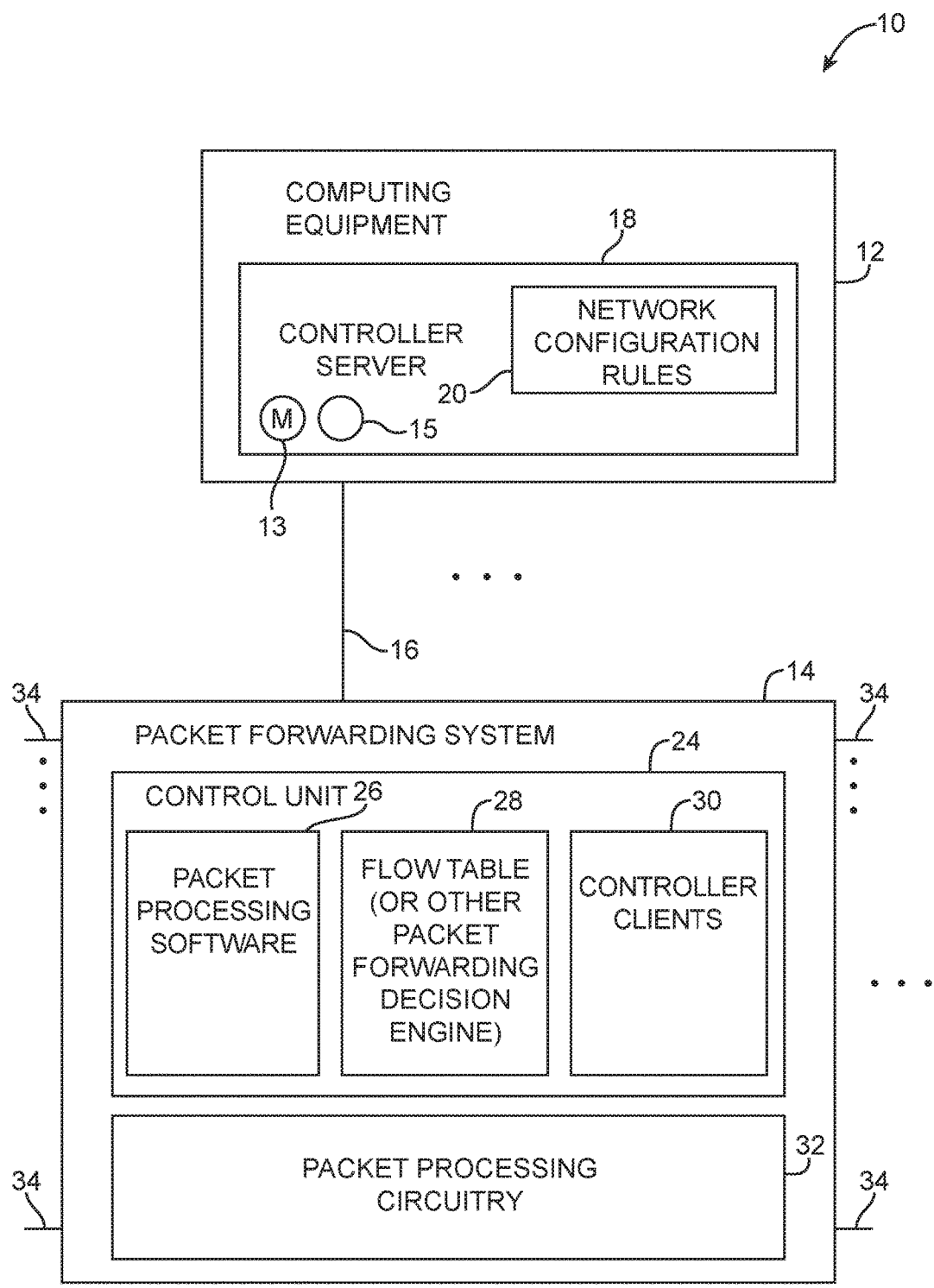
FIG. 1 is a diagram of an illustrative network that includes a controller and a packet forwarding system in accordance with an embodiment.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12. The database may, for example, be stored on storage 13 at controller server 18.

Storage 13 may include computer-readable media such as volatile memory, non-volatile memory, one or more hard drives, flash memory, random access memory (RAM), and/or any desired storage circuitry or devices. In one suitable arrangement, storage 13 may store software such as computer code (e.g., lists of instructions) that may be executed by processing circuitry on controller server 18 such as processing circuitry 15. Processing circuitry 15 may include one or more processors (e.g., central processing units (CPUs), microprocessors, or other control circuitry). Processing circuitry 15 may, for example, execute instructions or code stored on storage 13 (sometimes referred to herein as memory 13) to perform desired operations (e.g., operations associated with controlling and operating controller server 18 in controlling switches in a switch network, performing operations for a user, etc.). Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
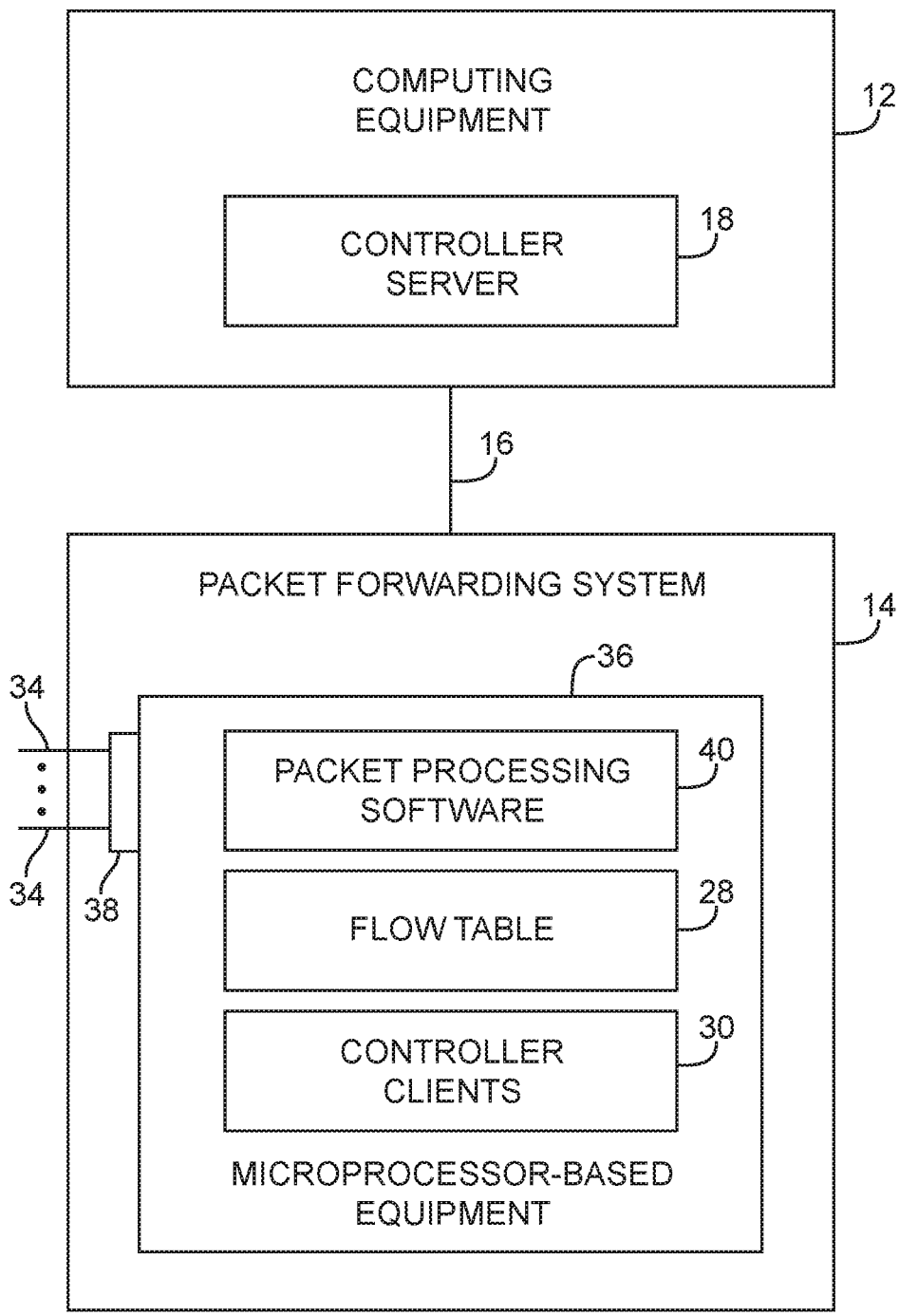
FIG. 2 is a diagram showing how a packet forwarding system may be implemented using microprocessor-based equipment that runs a packet processing engine in accordance with an embodiment.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
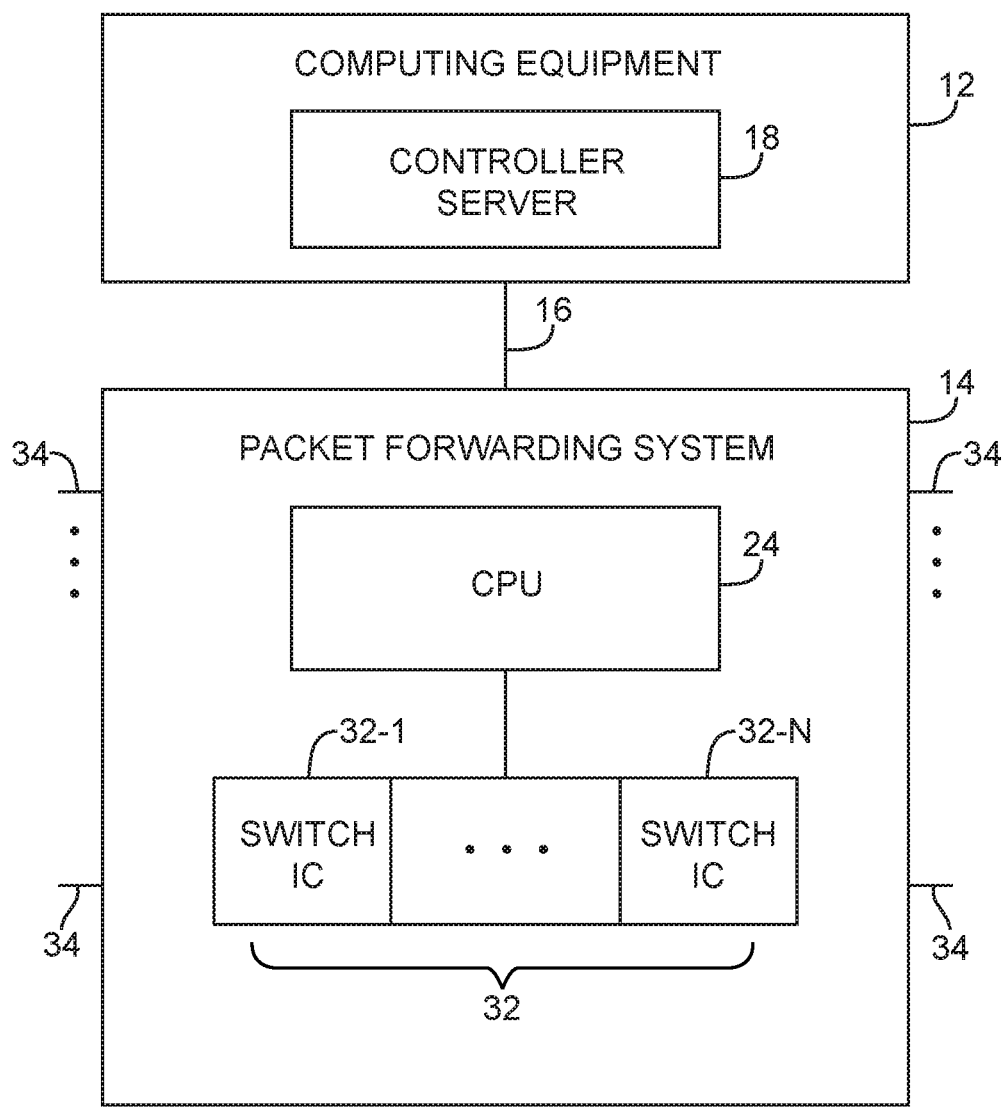
FIG. 3 is a diagram of a packet forwarding system and associated controller in which the packet forwarding system includes a control unit and associated switching integrated circuits in accordance with an embodiment.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
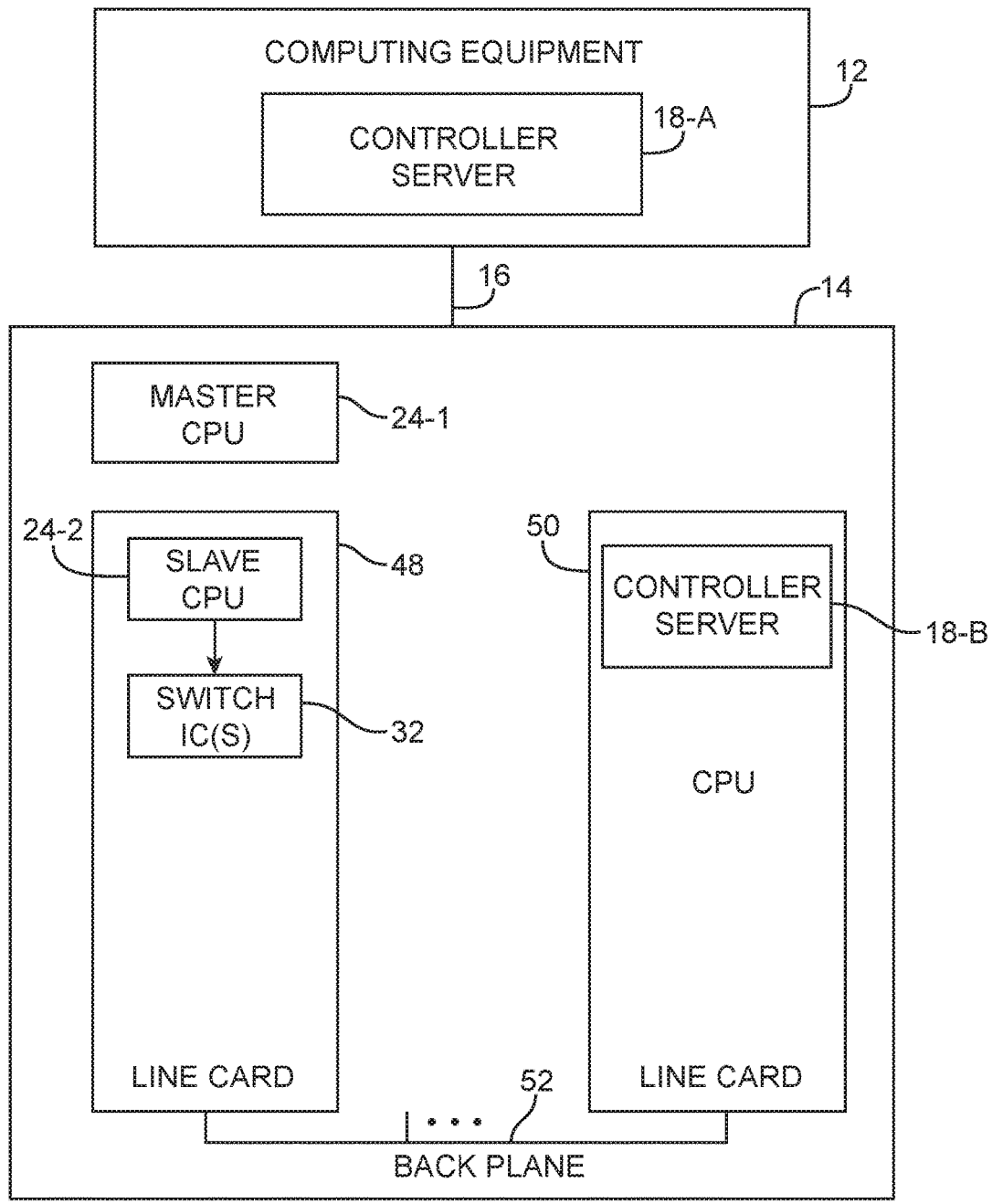
FIG. 4 is a diagram of a network in which a packet forwarding system has master and slave controllers and in which a controller server may be implemented on remote computing equipment or on a line card in the packet forwarding system in accordance with an embodiment.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
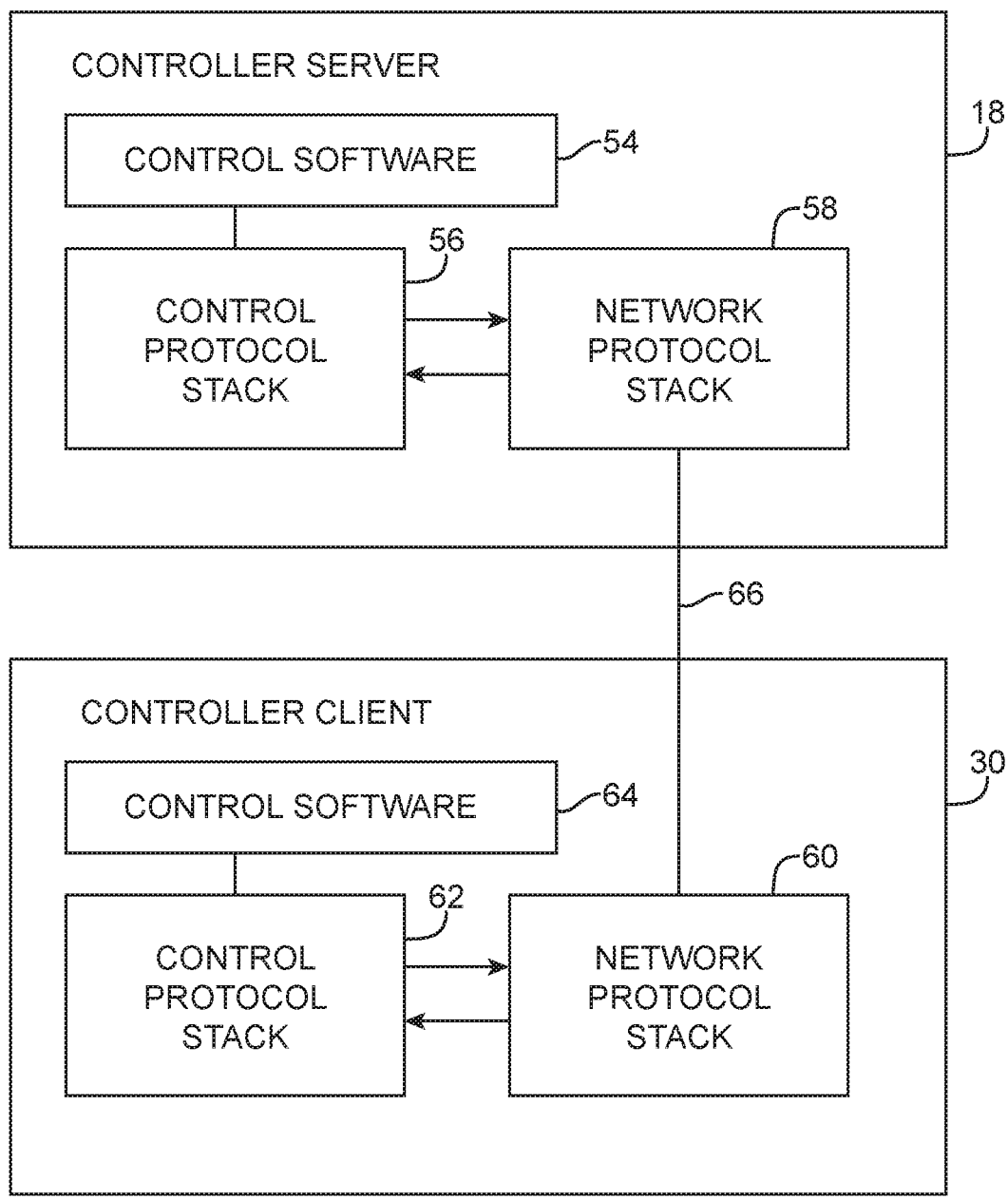
FIG. 5 is a diagram of a controller server and controller client that may communicate over a network connection in accordance with an embodiment.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 or other OpenFlow protocols (as examples).

Flow table 28 contains flow table entries (e.g., rows in the table) that have multiple fields (sometimes referred to as header fields). The fields in a network packet (sometimes referred to herein as a data packet or network data packet) that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
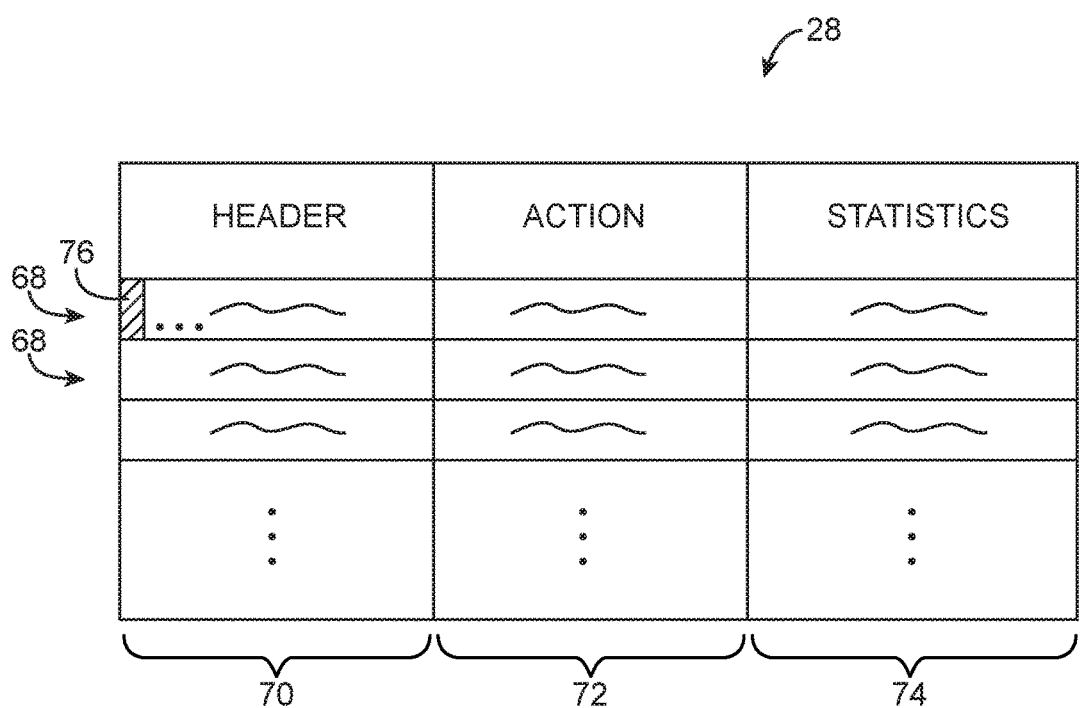
FIG. 6A is a diagram of an illustrative forwarding flow table of the type that may be used by a packet processing system in accordance with an embodiment.

An illustrative flow table is shown in FIG. 6A. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type (Ethertype), virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). In one suitable arrangement, the action field may instruct switch 14 to encapsulate a network packet using an on-switch encapsulation engine and to forward the encapsulated packet over a particular port (e.g., a network tunnel port). Similarly, the action field may instruct switch 14 to de-encapsulate an encapsulated network packet received over a particular port (e.g., a network tunnel port). Additional actions that may be taken by switch 14 include: an enqueue action to forward a packet through a queue attached to a port, a copy action (e.g., to provide copied network traffic at an identified port), and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. These examples are merely illustrative and, in general, any desired actions may be performed.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate (e.g., respective) flow table entries to form a path through the network (e.g., a path that implements desired network forwarding and configuration rules or policies).

Figure 7:
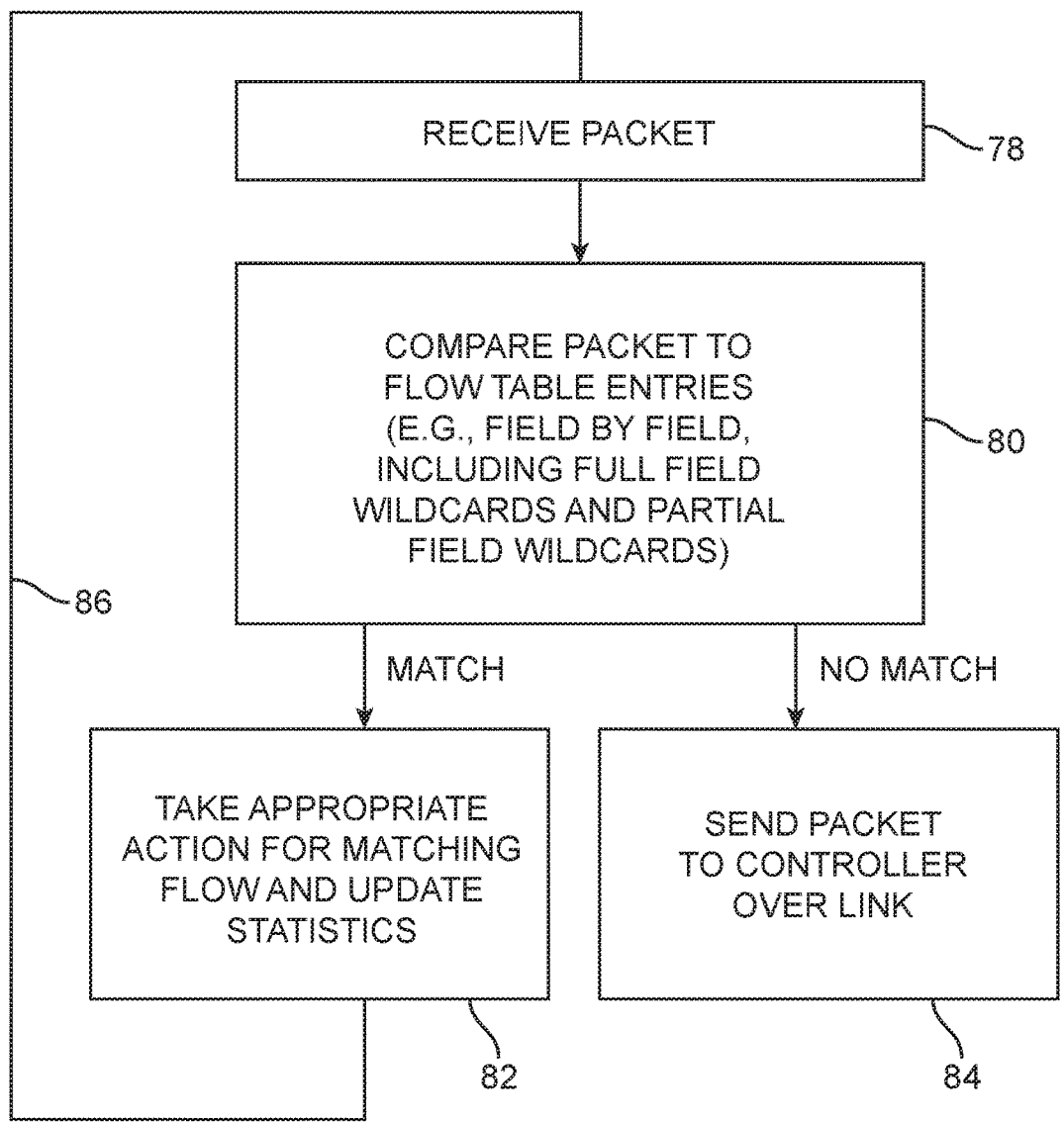
FIG. 7 is a flow chart of illustrative steps involved in processing packets in a packet processing system in accordance with an embodiment.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

As networks grow in complexity and size, there is increasing interest and need for network monitoring and analysis. It is generally desirable to perform such network monitoring and analysis without interrupting normal network operations (e.g., without reducing network performance or affecting normal network traffic forwarding). However, it can be challenging to add network monitoring devices to a network while efficiently utilizing network monitoring resources.

Figure 8:
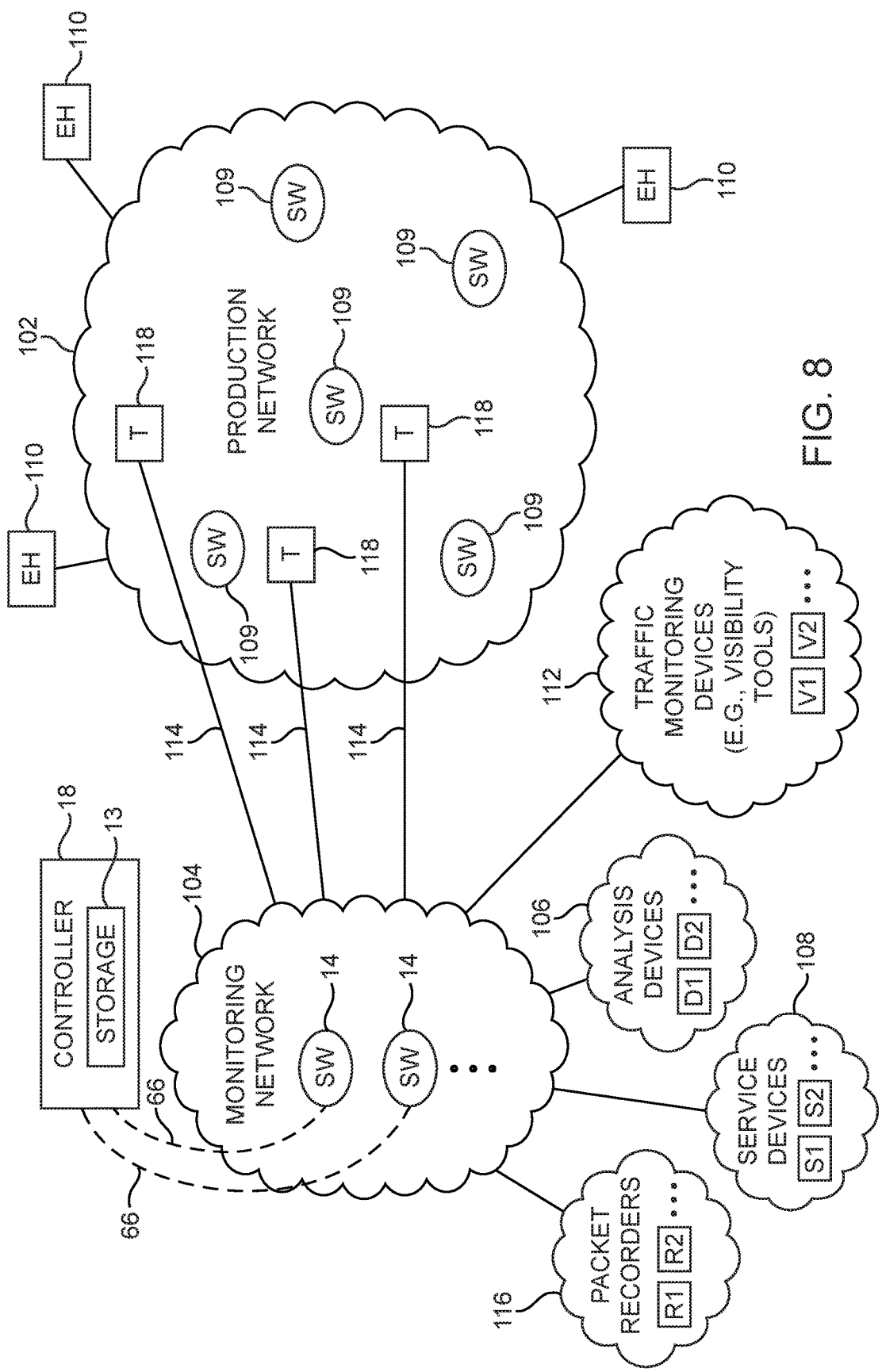
FIG. 8 is a diagram of an illustrative traffic monitoring network including a controller that controls switches in the traffic monitoring network to record packets at one or more packet recorders in accordance with an embodiment.

FIG. 8 is a diagram showing how a traffic monitoring network such as traffic monitoring network 104 coupled to a network 102 may be controlled by controller server 18 to help ensure efficient utilization of network monitoring resources such as packet recorders 116, services device 108, analysis devices 106, and traffic monitoring tools 112. Controller server 18 may sometimes be referred to herein as switch controller 18, controller 18, or computing equipment 18. Traffic monitoring network 104 may sometimes be referred to herein as monitoring network 104, analysis network 104, packet monitoring network 104, monitoring switch fabric 104, or monitoring fabric 104. Network 102 may sometimes be referred to herein as forwarding network 102, production network 102, production switch fabric 102, or production fabric 102. Production network 102 may, for example, be implemented locally (e.g., at a particular geographic location such as a school or college campus, server or data farm, building, business campus, airport, hospital, other locations having networks managed by one or more network administrators, etc.) or may be distributed across multiple geographic locations. Monitoring network 104 may, for example, be implemented locally (e.g., at the same geographic location as part or all of production network 102), may be implemented at a different geographic location than production network 102 (e.g., may be remote from network 102), or may be distributed across multiple locations, if desired.

Production network 102 may include switches 109 (or other packet forwarding systems similar to switches 14 of FIGS. 1-4) that forward network traffic between end hosts (EH) such as end hosts 110 of production network 102. For example, switches 109 may be interconnected via network paths coupled between ports of the switches. Network monitoring devices such as network tap devices 118 may be used to "tap" network traffic flows in production network 102 by sending copies of network packets observed by tap devices 118 to monitoring network 104 via paths 114 (sometimes referred to herein as tap paths). Network tap devices 118 may be interposed between network elements to monitor network traffic between the network elements. For example, a network tap device 118 may be interposed between ports of first and second switches to monitor traffic from the first to the second switch (or vice versa or both). The network tap devices may monitor traffic without interfering with network traffic flow between network elements.

Monitoring network 104 may include switches 14 that are controlled by controller 18 and may sometimes be referred to as client switches (e.g., switches 14 may include controller clients that communicate with controller 18 via control paths 66). Switches that do not communicate with controller 18 via control paths 66 (e.g., because the switches do not include controller clients) may be referred to as non-client switches. In the example of FIG. 8, switches 109 do not communicate with controller 18 and may be referred to as non-client switches. This example is merely illustrative. If desired, switches 109 of production network 102 may communicate with controller 18 or may communicate with a different controller (not shown).

If desired, monitoring network 104 may be coupled to analysis devices such as devices 106 that perform network analysis operations on traffic tapped from taps 118 in production network 102. If desired, monitoring network 104 may be coupled to service devices such as service devices 108 that perform network service operations on traffic tapped from taps 118 in production network 102. Analysis devices 106 such as analysis devices D1 and D2 and service devices 108 such as service devices S1 and S2 may be coupled to switches 14 of monitoring network 104. Analysis devices 106 may include network analysis tools such as network performance monitors, network capacity analysis tools, network outage analysis tools, or other network analysis tools for analyzing production network 102 based on tapped network traffic flows. The network analysis tools may, for example, be implemented on computing equipment that serve as end hosts of monitoring network 104 (e.g., analysis device D1 may serve as an end host of monitoring network 104 and one or more analysis tools may be implemented on analysis device D1).

Service devices 108 may serve to manipulate network traffic flows prior to analysis by devices 106 if desired. Service devices 108 may manipulate network traffic flows by replacing, removing, or otherwise modifying information stored in network packets of the traffic flows. Service devices 108 may, for example, include packet slicing tools, time-stamping tools, or other tools implemented using computing equipment. Multiple tools may be implemented on a service device 108, which serves as an end host of monitoring network 104.

Traffic monitoring devices 112 may serve to perform traffic monitoring operations on traffic flows in production network 102. Traffic monitoring devices 112 such as monitoring devices V1 and V2 may be coupled to switches 14 in monitoring network 104. Traffic monitoring devices 112 may include network traffic monitoring tools such as network visibility tools (sometimes referred to herein as visibility tools) or other network monitoring tools for monitoring traffic (e.g., network packets) in production network 102. Visibility tools on traffic monitoring devices 112 may include, for example, application performance monitoring tools (e.g., tools that monitor the performance of software applications running on end hosts 110 and/or switches 109 of production network 102), security tools (e.g., tools for monitoring the security of production network 102 and network traffic through production network 102), voice monitoring tools (e.g., voice-over-IP (VOIP) monitoring tools, LTE monitoring tools, etc.), or any other desired monitoring tools. Traffic monitoring devices 112 may, for example, be implemented on computing equipment (e.g., one or more servers) that serve as end hosts of monitoring network 104 (e.g., visibility device V1 may serve as an end host of monitoring network 104 and one or more visibility tools may be implemented on monitoring device V1).

Analysis devices 106, service devices 108, and traffic monitoring devices 112 may be formed on separate hosts (e.g., separate computers, servers, or other end hosts of monitoring network 104) or two or more of analysis devices 106, service devices 108, and traffic monitoring devices 112 may be formed on the same (shared) host (e.g., the same computer, server, etc.). In another suitable arrangement, two or more of service devices 108, analysis devices 106, and traffic monitoring devices 112 may be implemented on separate integrated circuits or using separate processors and storage on the same computer or server (e.g., on the same end host of monitoring network 104). Analysis devices 106, service devices 108, and/or monitoring devices 112 may be omitted if desired.

Tap paths 114 may be coupled to client switches 14 of monitoring network 104 (e.g., at ports 34 of the client switches as shown in FIG. 1). Ports 34 of client switches 14 that are coupled to tap paths 14 may sometimes be referred to as filter ports, ingress interfaces, or ingress ports of monitoring network 104, because the switch ports serve to interface with incoming network traffic from tap devices 118. Controller 18 may control client switches 14 to forward copied network traffic received from tap devices 118 (sometimes referred to herein as tapped traffic or tapped packets) to desired end hosts of network 104 and/or to controller 18 (e.g., to one or more analysis devices 106, service devices 108, traffic monitoring devices 112, and/or packet recorders 116).

In order to perform network monitoring, it may be desirable to store large volumes of data traffic (e.g., network packets) from production network 102. Storing large volumes of network packets may, for example, allow a user (e.g., a network or systems administrator of monitoring network 104 and/or production network 102) to query particular packets forwarded by production network 102 at a later time to monitor the operations of production network 102 and its corresponding end hosts 110 at a later time (e.g., where the particular packets to query are not necessarily known until well after the packets have traversed the network). For example, a security breach in production network 102 may not be detected for several hours, days, or weeks. By storing large volumes of the data packets that traverse network 102, the data packets themselves can be parsed to find data packets related to the security breach even after a significant amount of time has passed.

In order to store a large volume of data packets from production network 102, the switches of monitoring network 104 may be coupled to one or more packet recorder devices 116 (sometimes referred to herein as packet recorders 116). Packet recorder devices 116 such as packet recorder R1 and packet recorder R2 may store large volumes of copied traffic forwarded to monitoring network 104 from taps 118 in production network 102. Packet recorders 116 may, for example, be implemented on computing equipment such as a computer server (e.g., an X86 server) and may serve as end hosts of monitoring network 104. Packet recorders 116 may include storage such as memory, one or more hard disks, solid state drives, flash drives, or other storage circuitry. As an example, the storage on packet recorders 116 may have a capacity of 1 terabyte (TB), 10 TB, between 1 TB and 100 TB, more than 100 TB (e.g., 160 TB), or 500 TB or greater. While each packet recorder 116 may have a finite storage capacity, the packet storage capacity of monitoring network 104 may be further increased (e.g., horizontally scaled) by coupling additional packet recorders 116 to monitoring network 104. If desired, the packet storage capacity of monitoring network 104 may be further increased (e.g., vertically scaled) by installing expanding memory at one or more packet recorders 116. If desired, vertical and/or horizontal scaling may be used to provide monitoring network 104 with any desired packet storage capacity. Performing horizontal scaling may, for example, allow packet reordering at a higher aggregate data rate than would otherwise be supported by a single packet recorder 116. Consider an example in which packet recorder R1 supports packet recording at a rate of 10 Gbps. If a packet recording rate of 15 Gbps is needed, a second packet recorder that also supports packet recording at a rate of 10 Gbps such as packet recorder R2 may be coupled to monitoring network 104. This would provide an aggregate packet recording rate of 20 Gbps for monitoring network 104, which would in turn support packet recording at the desired 15 Gbps. In this example, controller 18 may control the client switches in monitoring network 104 to route tapped packets to one of packet recorders R1 and R2 so that the desired total aggregate packet recording rate may be realized. The packet storage capacity and/or the aggregate packet recording rate of network 104 may be increased over time as necessary (e.g., by adding packet recorders 116 or expanded memory at the packet recorders).

While analysis devices 106 and service devices 108 may include some storage capabilities, the storage capacity of packet recorders 116 are significantly greater than the storage capabilities of devices 106 and 108 and involve the storage of large volumes of entire data packets. For example, service devices 108 may temporarily store a window of network packets on which services are performed (e.g., modification services, filtering services, etc.). However, once the services have been performed, the storage on service devices 108 is cleared so that new windows of network packets may be received for servicing. Similarly, analysis devices 106 may store metadata from packets for performing analysis operations. However, analysis devices 106 typically do not store the entire network packet, let alone large volumes of network packets. Unlike devices 106 and 108, packet recorders 116 may store entire data packets for long periods of time (e.g., potentially indefinitely). As examples, packet recorders 116 may store data packets indefinitely, until a predetermined time, until the storage capacity of packet recorders 116 has been filled (at which point some of the stored packets may be deleted to make room for new packets), or until the stored packets have been queried for presentation to a user of monitoring network 104.

In some scenarios, in order to configure a packet recorder to store (record) desired network packets from production network 102, a user must physically go to the location of that packet recorder (i.e., the computer or server on which the packet recorder is implemented), interact with input-output equipment of the packet recorder (e.g., using a keyboard and mouse connected to the computer or server on which the packet recorder is implemented), and manually program packet recorder 116 to record desired packets. Once the packet recorder is programmed, the appropriate tapped data packets will be stored on the packet recorder. Similarly, when it is desired to examine the stored packets, the user needs to manually log in to the packet recorder to program the packet recorder to retrieve the desired packets and to send them elsewhere for processing.

Programming and querying packet recorders in this way may limit the scalability of monitoring network 104. For example, as the need for greater storage space for storing the network packets increases, the number of packet recorders needed to record all desired network traffic will increase. It can become increasingly difficult for a user to manually program and query each individual packet recorder as the size and packet storage requirements of network 104 increases. At the same time, if care is not taken, network packets to be stored and queried may take inefficient routes through monitoring network 104 and can otherwise reduce the efficiency of monitoring network 104, particularly as the scale of network 104 increases over time.

If desired, controller 18 may control monitoring network 104 to route tapped network traffic to desired packet recorders for storage and to query the network recorders when necessary, even as the scale and storage requirements of monitoring network 104 increases over time. For example, controller 18 may generate flow table entries for switches 14 in network 104 that control switches 14 to route tapped network packets from paths 114 to desired packet recorders 116 for storage. Similarly, controller 18 may control switches 14 to perform desired routing operations for stored packets that have been queried for further analysis. In one suitable arrangement, the queried packets may be routed to controller 18 (e.g., to analytics equipment at controller 18). Controller 18 (e.g., analytics equipment associated with controller 18) may coalesce the queried packets (e.g., from one or more packet recorders 116) into a result that may be further analyzed (e.g., by a user at a user interface associated with controller 18). In another suitable arrangement, the queried packets may be routed to traffic monitoring devices 112. Traffic monitoring devices 112 may, for example, perform any desired traffic monitoring or analysis operations on the queried packets. Unlike analysis devices 106, which analyze traffic routed from service devices 108 or from tap paths 114, traffic monitoring devices 112 perform analysis operations on recorded packets that have been queried by a user and routed from packet recorders 116 to the traffic monitoring devices over monitoring network 104.

Controller 18 may control switches 14 based on predetermined network policies and the current network topology of network 104. Controller 18 may actively monitor the network topology 104 so that controller 18 is aware of any changes to the monitoring network over time. For example, controller 18 may identify each packet recorder 116 that is coupled to network 104 (e.g., ports of switches 14 coupled to packet recorders 116 as well as information associated with the operation or capabilities of packet recorders 116). Controller 18 may regularly probe the topology of network 104 (e.g., using LLDP probe packets) to discover new packet recorders 116 that have been added to network 104 over time (e.g., when the horizontal scale of network 104 has been increased) and to identify information about the new packet recorders. In this way, controller 18 may always have an up-to-date knowledge of each packet recorder 116 coupled to monitoring network 104 and its corresponding capabilities.

Controller 18 may autonomously control switches 14 to route packets to particular packet recorders 116 for storage and to route queried recorded packets to desired destinations (e.g., so that the user does not need to keep track of each packet recorder 116 coupled to monitoring network 104). In this way, controller 18 may aggregate all of the packet recorders 116 into a single logical packet recorder, even as monitoring network 104 increases in scale and the number of packet recorders increases over time. This may allow the user to more simply record and monitor packets over time, even as the monitoring network increases in scale and size.

As an example, controller 18 may have an associated user interface (e.g., a graphical user interface displayed on a monitor or other display, input-output devices such as a mouse and keyboard, etc.). The user of monitoring network 104 need only interact with the user interface associated with control controller 18 to instruct controller 18 to control monitoring network 104 to perform desired packet recording operations. Similarly, the user need only interact with the user interface associated with controller 18 to query desired recorded packets for further processing. By allowing the user to only interact with a single device (e.g., controller 18), the ease of use of network 104 may be maintained for the administrator even as network 104 increases in scale and size, for example.

Figure 9:
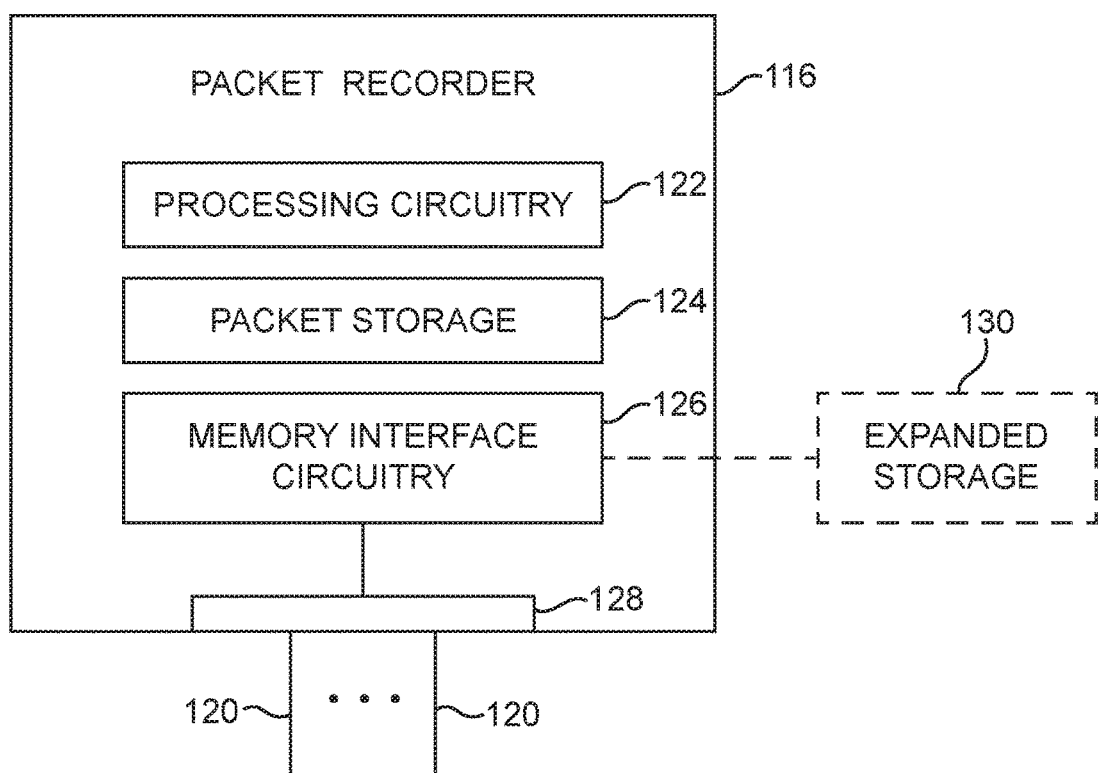
FIG. 9 is a diagram of an illustrative packet recorder having storage for recording network packets copied from a production network in accordance with an embodiment.

FIG. 9 is an illustrative block diagram of a packet recorder such as a given packet recorder 116 of monitoring network 104 (FIG. 8). Packet recorder 116 may, for example, be implemented on a computer or server device. As shown in FIG. 9, packet recorder 116 may have network interfacing circuitry (ports) 128 coupled to network paths 120. Network paths 120 may, for example, be coupled to one or more switches 14 of monitoring network 104. As one example, network interface 128 may include a single port coupled to a corresponding port on a corresponding switch 14. In another example, network interface 128 may include multiple ports each coupled to respective ports on one or more switches 14. If desired, packet recorder 116 may include a control interface coupled to controller 18 via a corresponding control path. For example, packet recorder 116 may have a dedicated query port or interface over which packet queries are received from controller 18 and over which packet recorder 116 provides queried packets to controller 18.

Packet recorder 116 may include processing circuitry such as processing circuitry 122 that controls the operation of packet recorder 116. Packet recorder 116 may include packet storage 124 for storing large volumes of network packets from production network 102. Packet storage 124 may include non-volatile memory, volatile memory, RAM, flash drives, one or more hard disks, solid state drives, or any other desired storage circuitry. Processing circuitry 122 may include one or more processors (e.g., microprocessors, central processing units (CPUs), etc.) or other desired processing or control circuitry. If desired, packet recorder 116 may include other storage for storing software that is executed using processing circuitry 122.

Memory interface circuitry 126 may be coupled between network interface 128 and packet storage 124. Memory interface circuitry 126 may control the writing (e.g., the storage or recording) of tapped network packets received over network interface 128 to packet storage 124. Similarly, memory interface circuitry 126 may control the reading of desired stored (recorded) network packets from packet storage 124. For example, processing circuitry 122 may identify particular packets to be retrieved (e.g., based on a packet request or query received from controller 18) and may control memory interface 126 to read those packets from storage 124 (e.g., from particular addresses on storage 124). The read packets may be output on lines 120 using network interface 128 or to controller 18 over a dedicated query interface. Switches 14 in monitoring network 104 may route the read packets to one or more desired locations (e.g., using flow table entries generated by controller 18).

In practice, each network port of packet recorder 116 may have a limited data rate (e.g., 10 Gbps, etc.). If desired, packet recorder 116 may concurrently receive tapped packets for storage over multiple network ports, thereby increasing the overall rate at which the tapped packets may be recorded at packet recorder 116 relative to scenarios where a single network port is used. Similarly, if desired, packet recorder 116 may concurrently transmit read packets over multiple network ports, thereby increasing the overall rate at which the read packets may be provided to monitoring network 104 relative to scenarios where a single network port is used.

In practice, packet storage 124 may have a finite capacity (e.g., 100 TB, 160 TB, 200 TB, etc.). As more and more packets from production network 102 are recorded over time, packet storage 124 may fill its capacity. In order to further expand the capacity of packet recorder 116, expanded storage such as storage 130 may be coupled to packet recorder 116. Expanded storage 130 may include flash memory, one or more hard disks, solid state drives, or any other desired storage. Expanded storage 130 may be installed at packet recorder 116 as necessary (e.g., thereby minimizing the cost of packet recorder 116 for a user until expanded storage capacity is needed). Expanded storage 130 may be installed internally on packet recorder 116 (e.g., via a bus within the housing or case of packet recorder 116) or may be installed externally (e.g., as an external hard drive or other circuitry that is coupled to packet recorder 116 over a data line such as a universal serial bus (USB) cable). If desired, the storage capacity of network 104 for recording packets from production network 102 may be further increased by installing additional packet recorders 116 (e.g., thereby minimizing the cost of installing packet storage capabilities on monitoring network 104 for a user until additional storage is needed). The example of FIG. 9 is merely illustrative. In general, packet recorder 116 may include other components arranged in any desired manner.

In one suitable arrangement, controller 18 may query packet recorders 116 to provide selected packets from packet storage 124 to a monitoring device such as device 112 of FIG. 8. For example, controller 18 may provide a control message (e.g., over control paths and/or network paths in monitoring network 104) to packet recorder 116 identifying particular data packets to monitor. Packet recorder 116 may retrieve the identified data packets from packet storage 124 and may provide the retrieved packets to switches 14 in monitoring network 104. Switches 14 may route the retrieved packets (e.g., using flow table entries generated by controller 18) to traffic monitoring device 112 for further processing.

Figure 10:
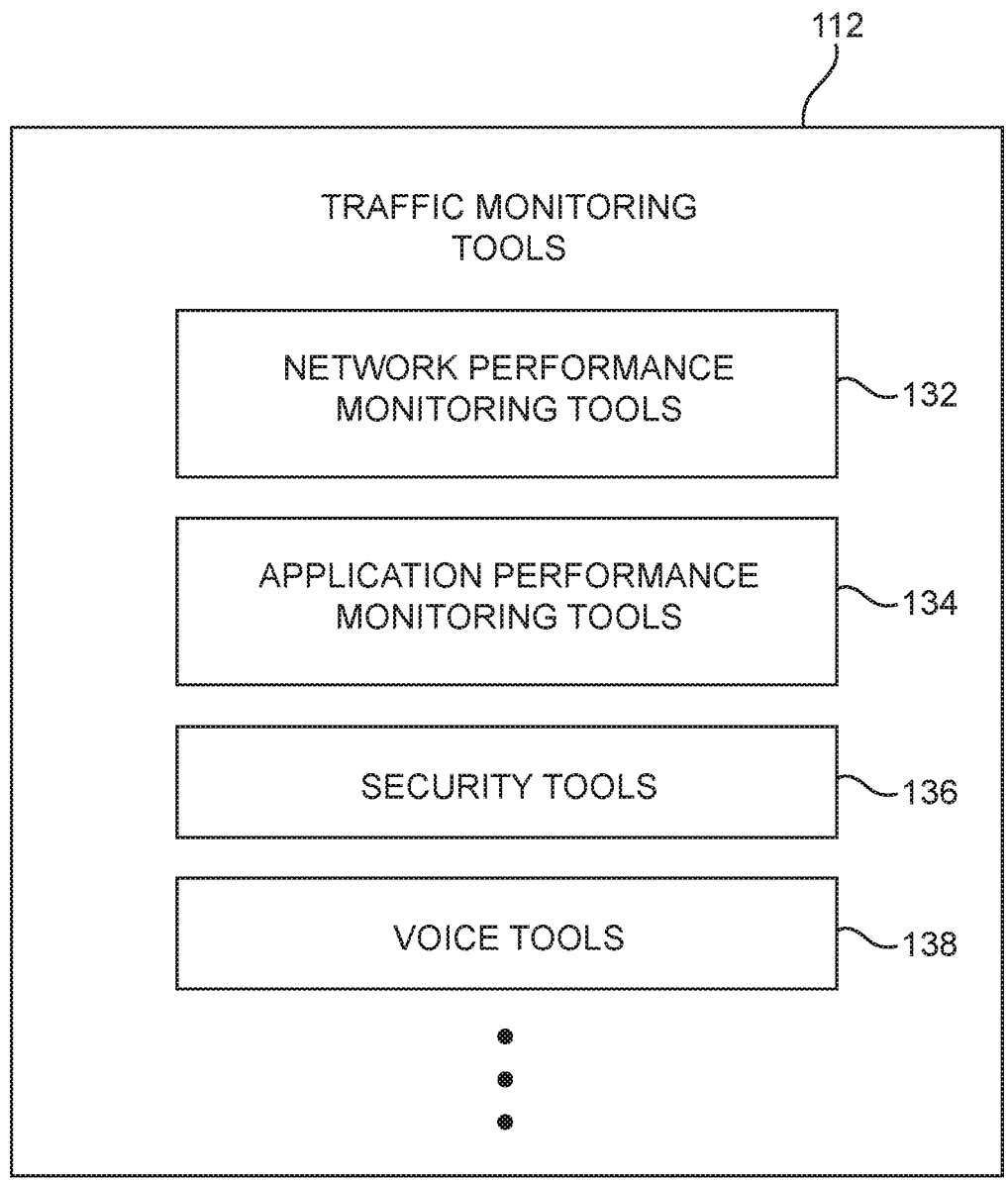
FIG. 10 is a diagram of illustrative traffic monitoring tools (visibility tools) for monitoring network packets that have been recorded at packet recorders accordance with an embodiment.

FIG. 10 is an illustrative block diagram of a traffic monitoring device such as a given traffic monitoring device 112 of monitoring network 104 (FIG. 8). Traffic monitoring device 112 (sometimes referred to herein as traffic monitoring tools 112) may, for example, be implemented on a computer or server device coupled to monitoring network 104. The computer or server device may, for example, include memory for storing software and processing circuitry for executing the software for performing desired traffic monitoring functions. Traffic monitoring tools 112 may perform traffic monitoring functions on the network packets retrieved from packet recorders 116 and routed to tools 112 by switches 14 in network 104.

As shown in FIG. 10, monitoring tools 112 may include network performance monitoring tools 132. Network performance monitoring tools 132 may process the retrieved packets (e.g., as received from one or more packet recorders 116 through switches 14) to monitor the performance of production network 102. For example, tools 132 may identify inefficiencies (e.g., loops, dropped connections, etc.) in production network 102 based on the received packets.

Monitoring tools 112 may include application performance monitoring tools 134. Application monitoring tools 134 may process the received packets to monitor the performance of applications running on end hosts 110 and/or switches 109 of production network 102 (e.g., applications that generated or processed the packets prior to those packets being tapped into monitoring network 104). In one suitable example, tools 134 may identify a particular application associated with the received packets (e.g., because the entire packet is recorded at packet recorder 116 including information that identifies the particular application associated with that packet). Tools 134 may process the received packets to identify how many of the recorded packets are associated with a particular application (e.g., to identify the volume of data traffic sent by a particular application on end hosts 110 of production network 102). Such information may, for example, be useful for a user in identifying the types of data traffic that is being handled by production network 102.

Monitoring tools 112 may include security tools 136. Security tools 136 may, for example, process the received packets to monitor the security of production network 102. Security tools 136 may, for example, identify security breaches of production network 102 (e.g., when unauthorized users have accessed network 102), identify particular users of production network 102 who have sent the packets and information about whether those users are so authorized, identify whether the packets include insecure data, or any other desired network security monitoring operations using the packets received from packet recorders 116.

Monitoring tools 112 may include voice tools 138. Voice tools 138 may monitor voice data packets routed through network 102. The voice data packets may, for example, include voice-over-IP (VOIP) data packets. Voice monitoring tools 138 may, for example, identify callers (e.g., senders or receivers of the voice packets), duration of calls, voicemail information, or any other desired information using the packets received from packet recorders 116. The example of FIG. 10 is merely illustrative. In general, one or more of tools 132, 134, 136, and 138 may be omitted, or other traffic monitoring tools may be included in tools 112. Tools 132, 134, 136, and 138 may each include dedicated hardware or may each be implemented using different software programs stored on memory, if desired.

Figure 11:
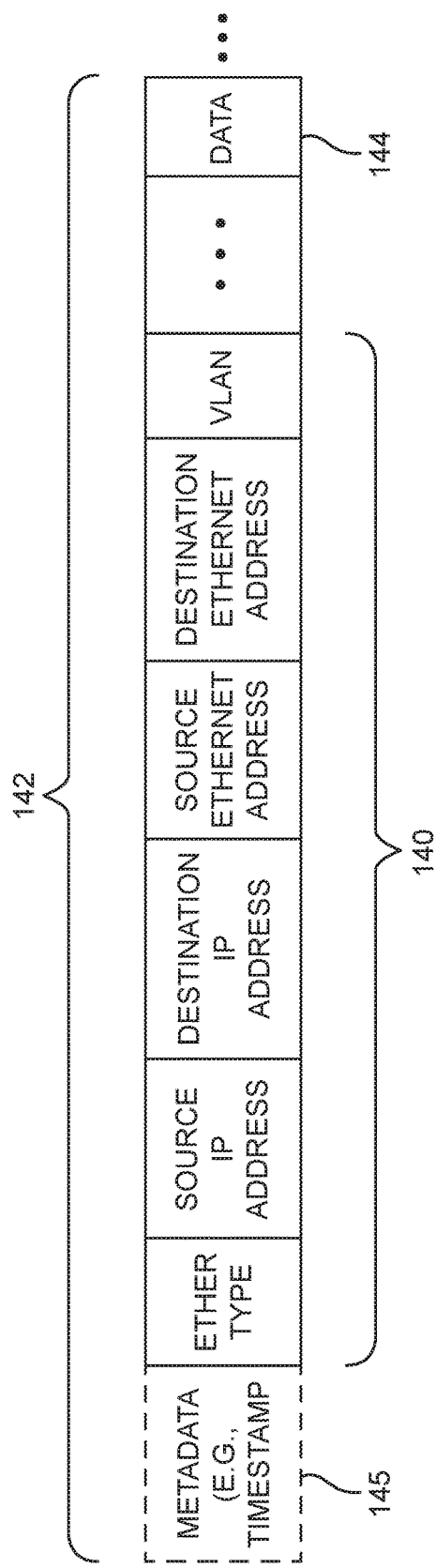
FIG. 11 is a diagram of an illustrative network packet that may be received at a traffic monitoring network from a production network and forwarded to a packet recorder in accordance with an embodiment.

FIG. 11 is an illustrative diagram of a network packet 142 that may be forwarded through a network such as production network 102 and that is monitored using monitoring network 104. Network packet 142 may be sent from a source end host to a destination end host of production network 102. As shown in FIG. 11, network packet 142 may include an Ethertype, a source internet protocol (IP) address, a destination IP address, a source Ethernet address, a destination Ethernet address, and a virtual local area network (VLAN) identifier stored in header fields 140 of network packet 142. Network packet 142 may include data in data field 144 (sometimes referred to as a payload in a payload field) to be forwarded from the source end host to the destination end host through production network 102.

The Ethertype may identify the type of network protocol used to encapsulate information in the data field of the network packet. For example, the Ethertype may identify that the data field includes information encapsulated using the Internet Protocol, the Link Layer Discovery Protocol, or other protocols such as broadcast discovery protocols.

The source IP address and source Ethernet address of network packet 142 may correspond to addresses associated with the source end host, whereas the destination IP address and destination Ethernet address may correspond to addresses associated with the destination end host. The VLAN identifier (tag) may identify a virtual local area network that is associated with the source end host. If desired, network packet 142 may include any desired combination of network attributes shown in FIG. 10 (e.g., information stored in network packet header fields) or may include additional header fields associated with network protocols (e.g., IP header fields, Ethernet header fields, etc.).

As shown in FIG. 11, additional data such as additional data 145 may be added or appended to data packet 142 upon storage of data packet 142 on a corresponding packet recorder 116 if desired. Additional data 145 may, for example, include metadata associated with the arrival of packet 142 in monitoring network 104 from production network 102 and/or associated with the storage of packet 142 on packet recorder 116. As one example, the metadata may include timestamp data indicative of a time at which packet 142 was written to memory on packet recorder 116 (e.g., the time stamp data may be added or appended to packet 142 by packet recorder 116). This is merely illustrative. If desired, the time stamp data may be added to packet 142 by switches 14 in monitoring network 104 (e.g., upon arrival at monitoring network 104 from production network 102) or by any other equipment associated with monitoring network 104. In general, metadata 145 may be generated at any desired time by any desired component coupled to monitoring network 104.

Packet 142 may be stored along with its metadata 145 at packet storage 124 on recorder 116 (FIG. 9) or metadata 145 may be stored separately from the remainder of packet 142 (e.g., at controller 18). When packet 142 is retrieved, packet 142 may be read out of packet storage 124 along with its metadata 145 if desired or may be located and read out based on its metadata (e.g., controller 18 may search the metadata to identify the location of the packets and may read instruct the packet recorder to read the packets out at a particular speed). Packet recorder 116 may output the retrieved packet into monitoring network 104 based on metadata 145 (e.g., based on time stamp data in metadata 145) if desired. For example, a set (e.g., a stream or sequence) of recorded packets may be read out from one or more packet recorders at times corresponding to the times at which the packets were recorded on the packet recorders or times at which the packets were received from production network 102 (e.g., at the same speeds or data rates and in the same sequence with which the packets were recorded), etc. In another suitable arrangement, the read packets may be output into network 104 at a slower rate than recorder 116 is otherwise capable of handling (e.g., to allow the read packets to be routed to a destination device such as monitoring tools 112 that have a slower input data rate than the maximum output rate of recorder 116).

In one suitable arrangement, packet 142 may include metadata 145 upon receipt at traffic monitoring tools 112. In another suitable arrangement, metadata 145 may be provided to tools 112 separately from the rest of the packets. If desired, traffic monitoring tools 112 may perform traffic monitoring operations on production network 102 based at least in part by metadata 145 (e.g., timestamp data) in the received packets. This example is merely illustrative and, if desired, the metadata may be stored elsewhere (e.g., on analytics equipment at controller 18 or other locations separate from the recorded packets).

Figure 12:
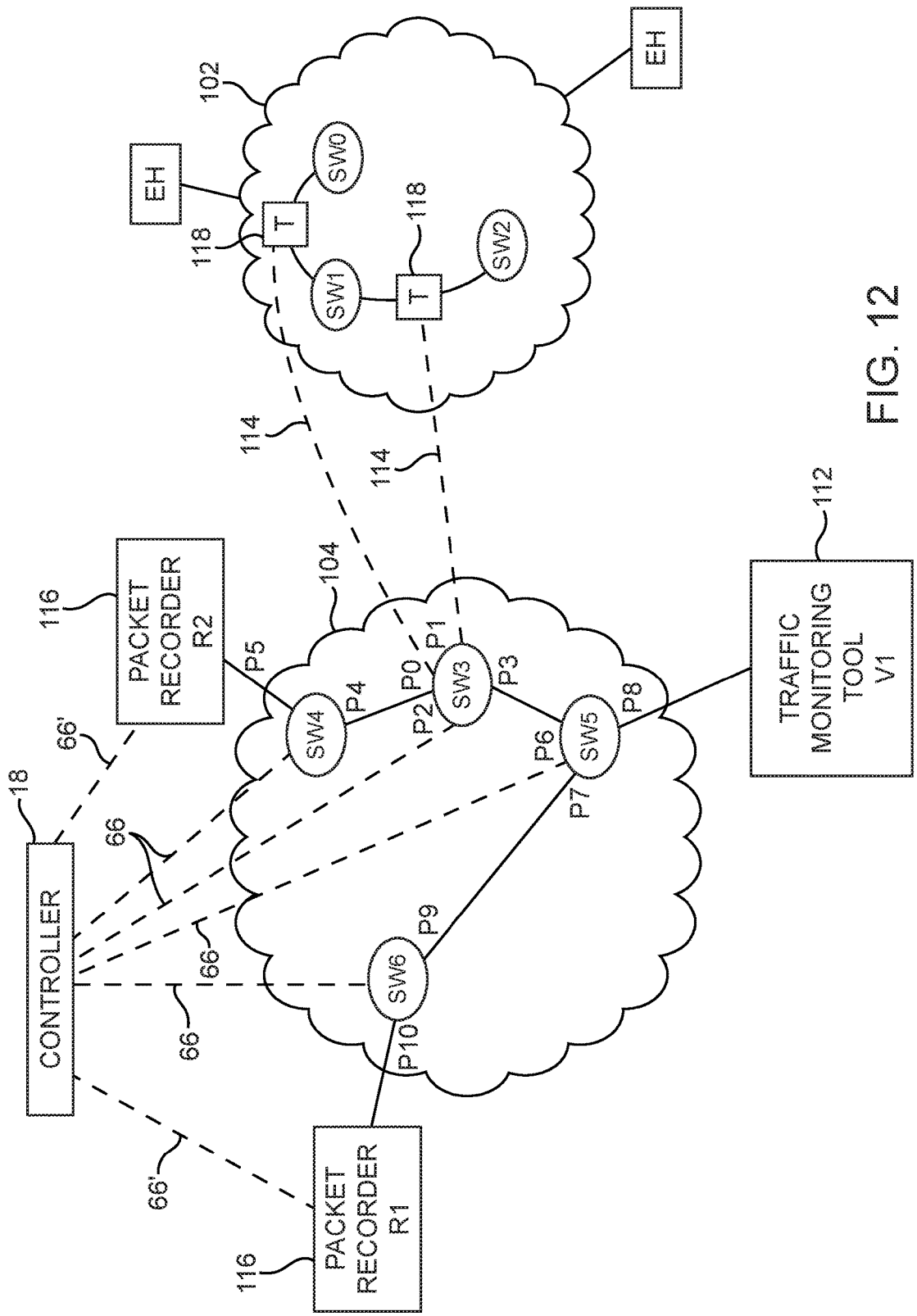
FIG. 12 is a diagram showing an example of a traffic monitoring network of the type shown in FIG. 8 having two packet recorders for recording network packets from a production network and one traffic monitoring tool for processing recorded network packets in accordance with an embodiment.

FIG. 12 shows one illustrative scenario in which controller 18 may be used to control a monitoring network 104 that is coupled to a production network 102 via tap devices 118.

As shown in FIG. 12, production network 102 may include switches such as switches SW0, SW1, and SW2. Network traffic may be routed through switches SW0, SW1, and SW2 (e.g., network traffic sent between end hosts 110). Network tap devices 118 may be interposed between switch SW1 and switch SW2 and between switch SW1 and SW0 (or any other desired locations in network 102). Tap devices 118 may serve to tap network traffic that passes through the tap devices by forwarding copies of the network traffic to monitoring network 104. Each tap device 118 may forward copied network packets to an ingress (filter) interface of monitoring network 104 (e.g., to a port of a respective client switch of network 104).

For example, a first network tap device 118 coupled between switches SW1 and SW2 may forward copied network packets to port P1 of client switch SW3, whereas a second network tap device 118 coupled between switches SW2 and SW0 may forward copied network packets to port P0 of client switch SW3. This is merely illustrative and, in general, the tap between switches SW1 and SW0 may be coupled to ports of other switches in monitoring network 104. The tap between switches SW1 and SW0 may be coupled between any desired pair of switches in production network 102. Tap devices 118 may forward copied network packets without modifying the original network traffic flow. For example, tap device 118 that is coupled between switches SW1 and SW2 may forward network packets between switches SW1 and SW2 while forwarding copies of the network packets to client switch SW3 in parallel.

If desired, tap devices 118 may be integrated into switches of production network 102. Any desired number of tapped devices 118 may be formed in production 102 for tapping network traffic to monitoring network 104 (e.g., one device 118, two devices 118, more than two devices 118, etc.). In an example where tap device 118 is formed on one of the switches of production network 102, the tap device 118 may be formed as dedicated circuitry on the switch or as software in the form of a port mirroring function (sometimes referred to as a SPAN function) that may be enabled or disabled. When the port mirroring function is enabled, all network traffic received by the switch at a first port may be copied and sent to a second port of the switch that serves as a tap port. When the port mirroring function is disabled, the second port may be unused or serve as a normal packet forwarding port.

Controller 18 may control client switches in monitoring network 104 to forward copied (tapped) network packets received over paths 114 to one or more packet recorders 116. Controller 18 may control client switches in monitoring network 104 to forward packets that have been recorded on packet recorders 116 to controller 18 (e.g., analytics tools at controller 18) and/or to one or more traffic monitoring tools 112.

In the example of FIG. 12, two packet recorders 116 (e.g., a first recorder R1 and second recorder R2) and one traffic monitoring device (tool) 112 (e.g., traffic monitoring tool V1) are coupled to respective client switches 14 in monitoring network 104. This is merely illustrative. If desired, tap paths 114 may be coupled to the same client switch as one or more of packet recorders 116 and/or traffic monitoring tool 112. Two or more of packet recorders 116 and traffic monitoring tool 112 may be coupled to different ports on the same switch. Fewer or more than two packet recorders 116 may be coupled to the client switches of monitoring network 104 if desired. More than one traffic monitoring tool 112 may be coupled to the client switches of monitoring network 104 if desired.

As one illustrative example, first packet recorder R1 may be coupled to port P10 of a corresponding switch SW6 and second packet recorder R2 may be coupled to port P5 of a corresponding switch SW6. Traffic monitoring tool V1 may be coupled to port P8 of a corresponding switch SW5. Ports that are coupled to traffic monitoring tools 112 may sometimes be referred to herein as delivery ports. Ports that are coupled to service devices 108 (FIG. 8) may sometimes be referred to herein as service ports. Port P7 of switch SW5 may be coupled to port P9 of switch SW6. Port P6 of switch SW5 may be coupled to port P3 of switch SW3. Port P2 of switch SW3 may be coupled to port P4 of switch SW4. This example is merely illustrative. In general, switches SW6, SW5, SW3, and SW4 may be coupled together in any desired manner. If desired, one or more of switches SW3, SW4, SW5, and SW6 may be coupled to two or more of switches SW3, SW4, SW5, and SW6. Additional client switches may be interposed between these switches if desired.

Controller 18 may provide control signals or control messages to control switches SW3, SW4, SW5, and SW6 and the other client switches in monitoring network 104 over control paths 66. The control messages may include forwarding table entries (e.g., flow table entries) that are loaded onto flow tables of the client switches. Control paths 66 may include dedicated control paths for conveying control messages between the client switches and controller 18 or some or all of control paths 66 may be implemented using the network paths of monitoring network 104. If desired, controller 18 may provide control signals or control messages to packet recorders 116 over control paths 66' (e.g., control paths coupled to dedicated query interfaces on packet recorders 116). Control paths 66' may include dedicated control paths coupled between controller 18 and packet recorders 116 or may be formed partially or entirely from control paths 66 and/or the network paths in monitoring network 104. If desired, a user may use the same input-output hardware (e.g., a workstation keyboard, mouse, and monitor) to control both controller 18 and packet recorders 116. If desired, the user may need only to interact with controller 18 and controller 18 may autonomously control packet recorders 116 over paths 66' without further input from the user.

Controller 18 may provide flow table entries such as entries 68 of FIG. 6A that direct the client switches to forward the copied network packets along controller-determined network paths in monitoring network 104. For example, a network packet sent from switch SW2 to SW1 may be copied by a tap device 118 and received at filter port P1 of client switch SW3. In this scenario, controller 18 may have provided flow table entries to client switches SW3, SW5, and SW6 that direct the client switches to forward the copied network packet to packet recorder R1. The copied network packet may be forwarded in sequence (e.g., first to switch SW5, then to switch SW6, and finally to packet recorder R1). Packet recorder R1 may store the packet until queried by controller 18. In one suitable arrangement, the tapped packets may be forwarded to a particular packet recorder 116 until the storage on that packet recorder is full. Once the storage on the packet recorder is full, controller 18 may control the client switches to forward the tapped packets to another packet recorder 116. In another suitable arrangement, the tapped packets may be forwarded to a desired packet recorder 116 as specified by a user of monitoring network 104.

As another example, switch SW3 may copy the packet received at port P1 from production network 102 to both packet recorders R1 and R2. In this scenario, switch SW3 may generate a copied (mirrored) packet of the packet received at port P1 and may provide the mirrored packet to packet recorder R2 via switch SW4. Controller 18 may provide control table entries to the switches of monitoring network 104 to perform these operations, for example. Providing copies of the tapped traffic to multiple packet recorders may allow for packet recording redundancy (e.g., if one packet recorder fails, packets from production network 102 may still be stored at and retrieved from another packet recorder coupled to monitoring network 104). If desired, each packet recorder may include multiple hard drives that each store copies of the same packet for further redundancy (e.g., using a redundant array of independent disks (RAID) scheme).

If desired, controller 18 may control the client switches to route tapped packets from different tap paths 114 to different packet recorders 116. In this example, controller 18 may control switches 14 (e.g., using flow table entries provided over control paths 66) to forward tapped packets received at port P0 of switch SW3 (e.g., tapped packets from tap 118 between switches SW1 and SW0) to packet recorder R1 and to forward tapped packets received at port P1 of switch SW3 (e.g., tapped packets from tap 118 between switches SW1 and SW2) to packet recorder R2. In another suitable arrangement, controller 18 may control the client switches to route tapped packets from different tap paths 114 to the same packet recorder 116. In this example, controller 18 may control switches 14 to forward tapped packets received at both ports P0 and P1 to the same packet recorder 116.

In general, the user of monitoring network 104 may provide a packet recorder policy (sometimes referred to herein as a packet recording policy) that specifies what packets should be tapped and how those packets should be recorded. The packet recorder policy may identify particular packet recorders to use or may instruct controller 18 to assign the tapped packets to suitable packet recorders that would optimize the routing efficiency of monitoring network 104. Controller 18 may control client switches 14 to route the tapped packets to packet recorders 116 based on the packet recorder policy and based on any other desired network policies associated with monitoring network 104 (e.g., if a network policy specifies that switch SW4 is not to be used to forward tapped packets, this may override a packet recorder policy for tapped packets to be recorded at packet recorder R2 and the tapped packets may instead be recorded at packet recorder R1, etc.).

When it is desired to monitor production network 102 based on the recorded packets, a user may issue a recorded packet query to controller 18. Controller 18 may query packet recorders 116 to read recorded packets associated with the query (e.g., by providing control messages to the packet recorders over control paths 66'). Packet recorders 116 may read the recorded packets associated with the query from memory and may inject the packets into monitoring network 104. Controller 18 may control the client switches in monitoring network 104 to forward the queried packets to desired destinations. For example, controller 18 may control the client switches to forward the queried packets to controller 18 (e.g., via control paths 66) or to traffic monitoring tool V1. In another suitable arrangement, controller 18 may control packet recorders 116 to transmit the queried packets directly to controller 18 over control paths 66'. If desired, controller 18 may control the client switches to forward the queried packets to a sequence of different devices or tools coupled to monitoring network 104.

In one illustrative example, the user may instruct controller 18 to send a particular set of recorded packets to traffic monitoring tool V1. Controller 18 may identify which packet recorders are used to store the packets in the set and may instruct those packet recorders and the client switches to forward those packets to traffic monitoring tool 112. In another suitable arrangement, controller 18 may send instructions to all of the packet recorders to find the packets from the set of recorded packets and the packet recorders may subsequently find those packets and transmit the packets to the client switches (e.g., controller 18 need only know where packet recorders 116 are coupled to the monitoring network and need not know the precise location at which each of the data packets are recorded).

Figure 13:
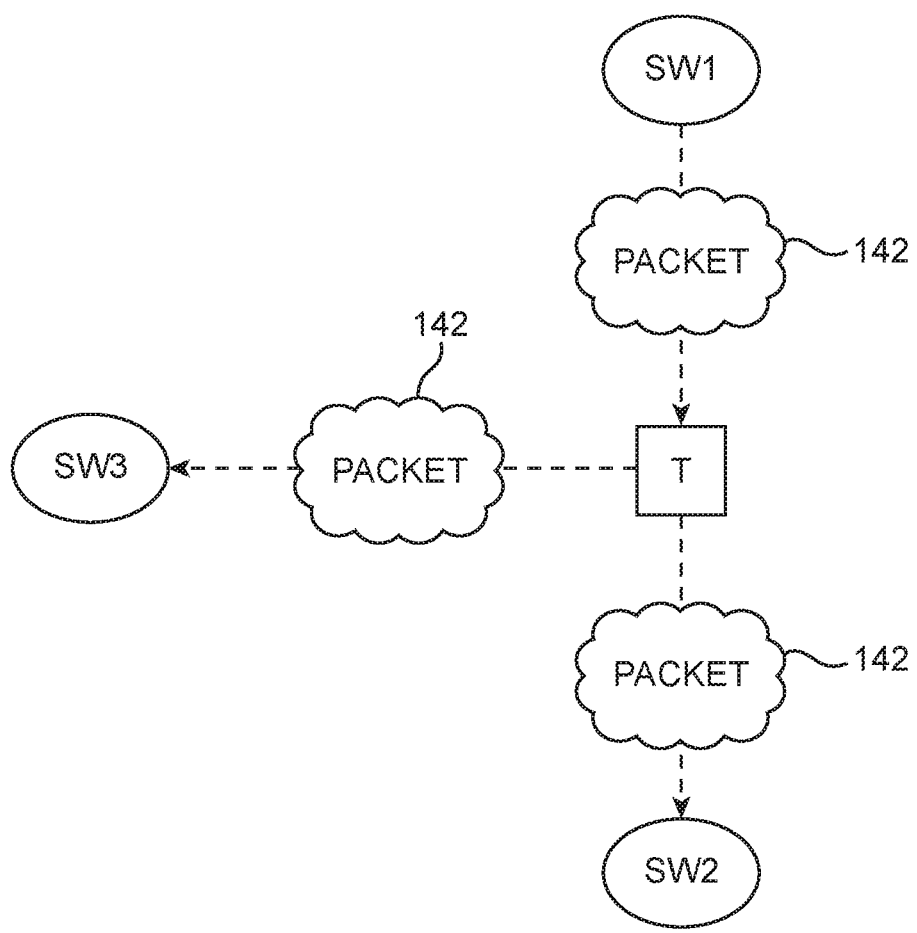
FIG. 13 is a diagram showing how a network packet may be copied by a network tap device of a production network in accordance with an embodiment.

FIG. 13 is an illustrative diagram showing how a tap device 118 in production network 102 may copy network packets sent between switches SW1 and SW2 (e.g., switches SW1 and SW2 of FIG. 12). As shown in FIG. 13, a network packet 142 may be forwarded from switch SW1 to switch SW2. Network packet 142 may be received by tap device 118. Tap device 118 may forward the network packet to switch SW2 to ensure normal network operations for production network 102 (e.g., the network packet may be forwarded to switch SW2 unaltered, as if no tap device was coupled between switches SW1 and SW2). Tap device 118 may, in parallel, send a copy of network packet 142 to switch SW3 of monitoring network 104 (e.g., via tap paths 114 of FIG. 12).

Figure 14:
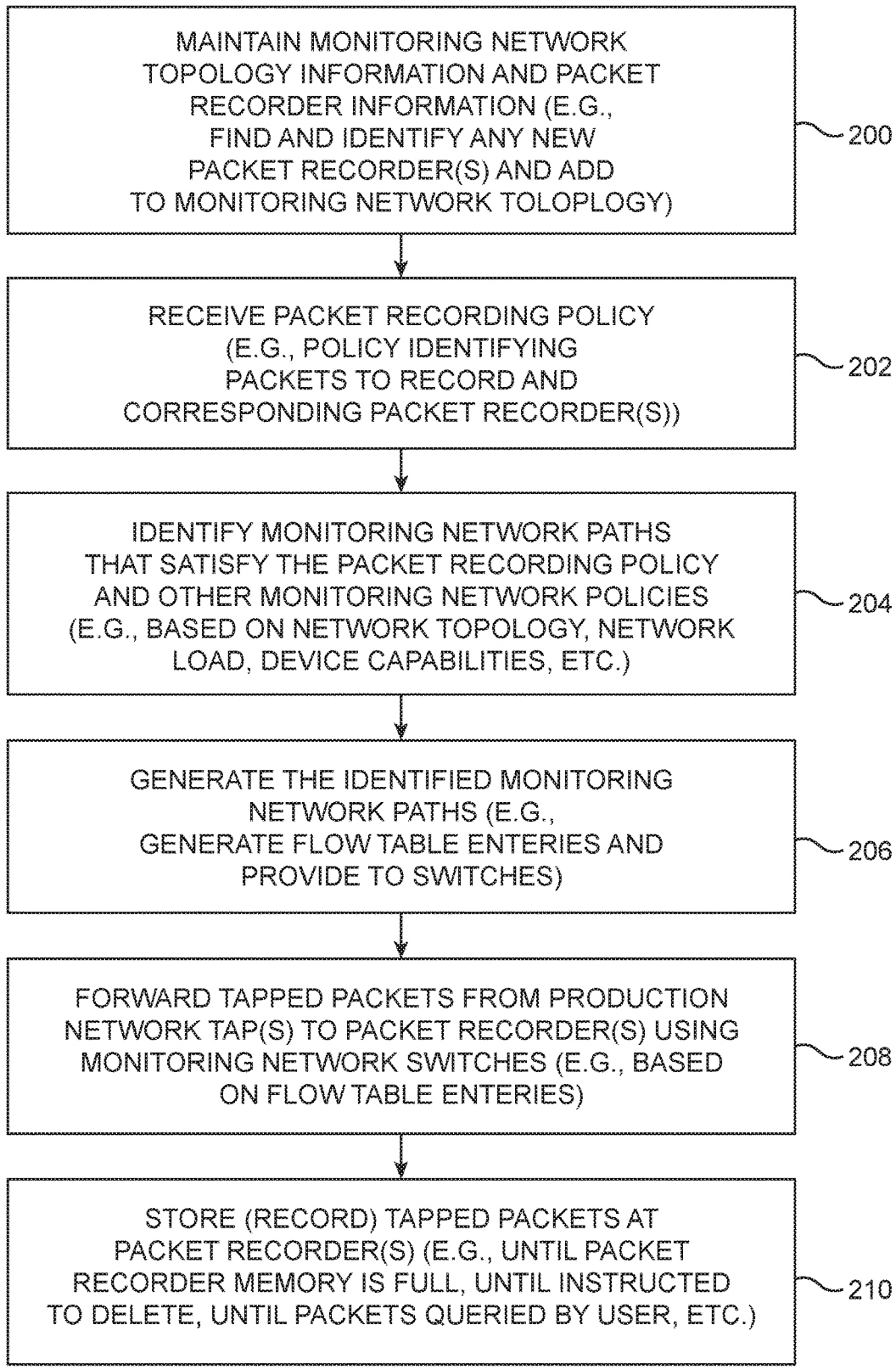
FIG. 14 is a flow chart of illustrative steps that may be involved in operating a controller of a traffic monitoring network to record network packets from a production network at packet recorders in accordance with an embodiment.

FIG. 14 is a flow chart of illustrative steps that may be performed by a controller such as controller 18 of FIGS. 8 and 12 in controlling monitoring network 104 to record tapped packets at one or more packet recorders 116.

At step 200, controller 18 may begin maintaining network topology information associated with monitoring network 104. Controller 18 may actively gather information about the topology of monitoring network 104. For example, controller server 18 may send Link Layer Discovery Protocol (LLDP) probe packets through the network to discover the topology of monitoring network 10. Controller 18 may use information on network topology and information on the capabilities of network equipment to determine appropriate paths for packets flowing through the network. The network topology information may be stored on controller 18 and may be updated as the topology of network 104 changes over time (e.g., as switches are added or removed from network 104, as the links between switches in network 104 change, as switches, links, or other hardware fails in network 104, as end hosts are coupled to or removed from network 104, etc.).

Controller 18 may identify information about all of the packet recorders 116 that are coupled to monitoring network 104. For example, controller 18 may identify an attachment point for each packet recorder 116 (e.g., a client switch port coupled to the packet recorder such as switch ports P10 and P5 of FIG. 12), may identify capabilities of each packet recorder (e.g., hardware or software characteristics of the packet recorder, a storage capacity of the packet recorder, an input data rate associated with the speed at which the packet recorder can receive and store data packets, an output data rate associated with the speed at which the packet recorder can read and output stored data packets, etc.). Controller 18 may, for example, identify the packet recorders 116 using the LLDP probe packets sent through network 104 or directly over paths 66'. Controller 18 may autonomously update the network topology every time a new packet recorder 116 is added to monitoring network 104. For example, new packet recorders may be periodically coupled to monitoring network 104 over time as the packet storage requirements for monitoring network 104 increase. Controller 18 may identify new packet recorders as they are connected to network 104 and may thereby maintain up-to-date information about all of the packet recorders and the packet storage capabilities of monitoring network 104 at any given time.

For example, controller 18 may add the new packet recorder to a single logical packet recorder that logically represents all of the packet recorders as a single logical recorder for a user of monitoring network 104. This may, for example, allow the user of monitoring network 104 to interact with controller 18 as if only a single packet recorder is connected to network 104 while controller 18 autonomously maps requests to individual packet recorders of the logical packet recorder (e.g., thereby simplifying the use of network 104 for a user relative to scenarios where the user must interface with each packet recorder individually).

At step 202, controller 18 may receive a packet recording policy. For example, controller 18 may receive the packet recording policy from a user of monitoring network 104.

The user may enter the packet recording policy using user input devices and/or software tools associated with controller 18, for example. In another suitable arrangement, the packet recording policy may be specified autonomously (e.g., by software running at controller 18 or by other computing equipment coupled to controller 18). The packet recording policy may, for example, identify particular sets of tapped packets from production network 102 that are to be recorded at packet recorders 116 of monitoring network 104. The packet recording policy may, if desired, specify particular packet recorders 116 at which the sets of tapped packets are to be recorded to or may allow controller 18 to automatically assign the sets of tapped packets to corresponding packet recorders 116.

The packet recording policy may, for example, specify particular attributes (e.g., packet header fields and/or filter ports) that match on the desired set of tapped packets. As some examples, the packet recording policy may specify that all tapped packets received at port P1 are to be routed to and stored at packet recorders 116, that all tapped packets received at port P0 are to be routed to and stored at packet recorders 116, that some of the tapped packets received at port P1 and/or P2 are to be routed to packet recorders 116 (e.g., packets having a particular destination IP address header field, source Ethernet address header field, packets generated by a particular software application, voice data packets, etc.), that some or all of the tapped packets received over port P0 and/or P1 during a particular time period are to be forwarded to and recorded at packet recorders 116, that some or all tapped packets received over any filter port are to be forwarded to and recorded at packet recorders 116, etc. In these examples, the packet recording policy does not specify a particular packet recorder 116 to use. If desired, the packet recording policy may identify that a subset of or all of the tapped packets are to be copied between multiple packet recorders 116 (e.g., for redundancy).

If desired, the packet recording policy may identify particular packet recorders to use for particular sets of tapped packets. As some examples, the packet recording policy may specify that all packets received over all tap paths 114 that were generated by a particular software application are to be sent to packet recorder R1, that some of the packets received at port P0 are to be routed to and stored at packet recorder R2 while other packets received at port P0 are to be routed to and stored at packet recorder R1, that some or all of the packets received at port P1 are to be routed to and stored at recorder R1 whereas some or all of the packets received at port P0 are to be routed to and stored at recorder R2, that all tapped packets of voice data are to be copied to packet recorder R1 (e.g., in scenarios where packet recorder R1 is a dedicated voice data recorder), that some or all tapped packets that are encrypted are to be forwarded to and stored at a particular packet recorder 116 (e.g., a dedicated packet recorder for storing encrypted data), that all packets received over tap paths 114 are to be routed to the nearest packet recorder 116 having available storage space (e.g., packet recorders having free space that are the fewest number of hops from the filter port), etc.

At step 204, controller 18 may identify paths in monitoring network 104 that satisfy the packet recording policies and any other desired network policies associated with monitoring network 104 (e.g., network configuration rules 20 as shown in FIG. 1). For example, controller 18 may identify the paths so that desired sets of the tapped data are routed to one or more packet recorders 116 based on information maintained at the controller such as network load and device capabilities to improve performance, to satisfy policy-defined requirements, or to satisfy any desired criteria. In scenarios where the packet recording policy does not identify a particular packet recorder to use, controller 18 may identify the paths so that the paths route the desired sets of tapped packets to a packet recorder having available storage space in a manner that optimizes network load, satisfies policy-defined requirements, or satisfies any other desired criteria.

At step 206, controller 18 may generate the paths identified during step 204. The controller may communicate with client switches 14 in generating the identified paths. For example, controller 18 may provide flow table entries that direct the client switches to forward and modify network packets matching the flow table entries along the desired network paths.

At step 208, the client switches of monitoring network 104 may forward the set of tapped packets associated with the packet recording policy along the paths identified while processing step 204.

Consider one illustrative example in which the packet recorder policy specifies that all tapped packets received over port P1 having a source IP address of IPX are to be stored at both packet recorders R1 and R2. In this example, controller 18 may identify a first path from port P1 to packet recorder R1 (e.g., via port P3 of switch SW3, ports P6 and P7 of switch SW5, and ports P9 and P10 of switch SW6) and a second path from port P1 to packet recorder R2 (e.g., via port P2 of switch SW3 and ports P4 and P5 of switch SW4). Controller 18 may generate corresponding flow table entries and may provide the flow table entries to the client switches (e.g., over control paths 66).

Packets routed between switches SW1 and SW2 of production network 118 will be routed to port P1 on switch SW3 over a corresponding tap path 114. Switch SW3 will compare all of the tapped packets received over port P1 to the flow table entries. If the tapped packets have a source IP address of IPX, switch SW3 may forward those tapped packets to packet recorder R1 (via switches SW5 and SW6 along the corresponding network path) and may generate a copy of the tapped packet (e.g., may mirror the tapped packet). The copy of the tapped packet may be forwarded to packet recorder R2 via switch SW4. Switch SW3 may perform any corresponding actions on the tapped packets received over port P1 that do not have source IP address IPX (e.g., based on the other flow table entries on switch SW3). As examples, switch SW3 may drop those packets, may forward those packets to controller 18, or may forward those packets to other destinations via monitoring network 104.

At step 210, packet recorders 116 may store (record) the tapped packets received from the client switches of monitoring network 104 on packet storage 124 (FIG. 9). If desired, packet recorders 116 may generate and/or store metadata such as timestamp data (e.g., a time stamp of when the packet was stored) along with the data packet or may provide the metadata to other equipment. Packet recorders 116 may continue to store the tapped packets until packet storage 124 is full or until packet recorders 116 receive an instruction to stop recording packets. The recorded packets may remain in packet storage on the packet recorders indefinitely, until controller 18 instructs the packet recorders to delete the recorded packets, or until the recorded packets are retrieved by controller 18 for presentation to a user or transmission to another location (e.g., the packets may remain in the packet storage after being read or queried by controller 18 or may be deleted from packet storage after being read). When the packet storage is full, controller 18 may adjust the network policies of monitoring network 104 so that the full packet recorder is no longer used to store tapped packets or may instruct the packet recorder to delete a particular set of the recorded packets (e.g., a particular volume of the oldest-recorded packets). In another suitable arrangement, controller 18 may generate a notification or alert to the user to allow the user to identify packets stored in the packet recorder to keep, and may delete all of the other packets from storage to make room for new packets.

Figure 15:
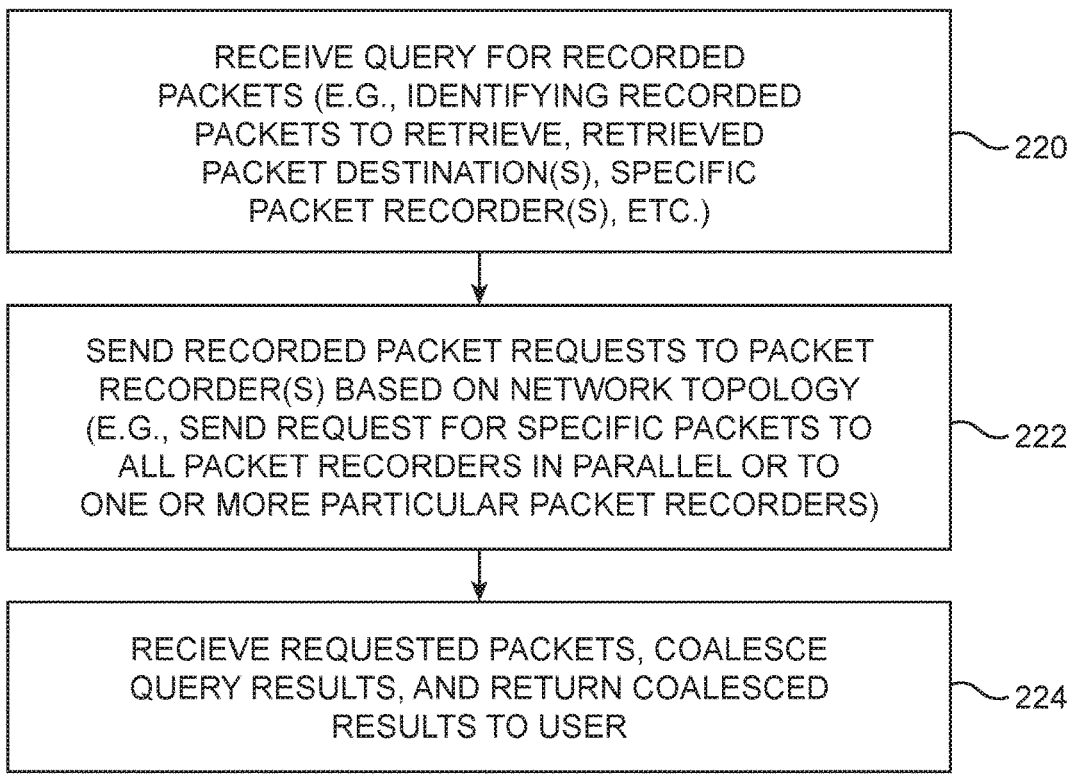
FIG. 15 is a flow chart of illustrative steps that may be involved in operating a controller of a traffic monitoring network to query network packets recorded at packet recorders (e.g., for presentation to a user of the traffic monitoring network) in accordance with an embodiment.

FIG. 15 is a flow chart of illustrative steps that may be performed by a controller such as controller 18 of FIGS. 8 and 12 querying packets stored on packet recorders 116 (e.g., for further analysis or presentation to a user of monitoring network 104).

At step 220, controller 18 may receive a query for recorded packets (sometimes referred to herein as a recorded packet query or a packet query). For example, controller 18 may receive the recorded packet query from the user of monitoring network 104. The user may, for example, enter the recorded packet query using input devices and/or software tools associated with controller 18, for example. In another suitable arrangement, the recorded packet query may be generated autonomously (e.g., by software running at controller 18 or by other computing equipment coupled to controller 18). The recorded packet query may, for example, identify particular sets of tapped packets that are recorded at packet recorders 116 and that are to be read from packet recorders 116. The recorded packet query may, if desired, specify particular packet recorders 116 at which the sets of tapped packets to be queried are located. However, the user need not have knowledge of the packet recorder at which the sets of queried packets are located.

The sets of tapped packets that are to be read (e.g., the sets of tapped packets that are queried) may, for example, be packets associated with events in production network 102 that the user desires to monitor, review, or analyze. Any desired attributes of the recorded packets may be used by the user to identify sets of tapped packets to read such as header fields, sources or destinations of the packets, filter ports over which the packets were received, time frames over which the packets were received, layer-1 (L1) packet information (e.g., physical layer information), layer-2 (L2) packet information (e.g., data link layer information), layer-3 (L3) packet information (e.g., network layer information), layer-4 (L4) packet information (e.g., transport layer information), layer-5 (L5) packet information (e.g., session layer information), layer-6 (L6) packet information (e.g., presentation layer information), layer-7 (L7) packet information (e.g., application layer information), an encryption scheme used to encrypt the packets, software applications used to generate the packets, and/or any other desired packet attributes.

In one suitable arrangement, the user may specify the particular packet recorder from which to retrieve the desired recorded packets. In this scenario, the controller may send a request to retrieve the desired packets to the specified packet recorder. In another suitable arrangement, controller 18 may maintain information identifying which packet recorder 116 is storing the desired packets and may send a request to retrieve the desired packets to that packet recorder. However, controller 18 need not have knowledge of the particular packet recorder on which the desired packets are stored.

In this scenario, controller 18 may send a request (query) for the desired packets to all packet recorders 116 of monitoring network 104 (step 222). Controller 18 may send the requests to each of the packet recorders in parallel (e.g., to each packet recorder concurrently) to minimize the time required to find the desired recorded packets. Controller 18 may send the requests to the packet recorders over control paths 66' (FIG. 12).

Once the packet recorders have received the requests, the packet recorders may determine whether the desired packets are stored on their corresponding packet storage. For example, a given packet recorder may use packet identifying information in the received query to search its corresponding packet storage for the requested stored packets. If desired, the packet recorder may search over metadata 145 associated with all of the packets stored on its packet storage to locate the requested stored packets. Searching over the metadata may, for example, be significantly faster than searching over the entire packet storage. If none of the requested packets are located on the packet recorder, the packet recorder may discard the request. If one or more of the requested packets identified by the request (query) are stored on the packet recorder, the packet recorder may read the requested packets from packet storage and may provide the read packets to the client switches of network 104 or to controller 18 (e.g., over control path 66'). In scenarios where the read packets are provided to the client switches, controller 18 may control the client switches to forward the read packets to a desired destination (e.g., using flow table entries).

At step 224, controller 18 may receive the requested packets from one or more packet recorders 116 (e.g., over paths 66'). Controller 18 (e.g., an analytics engine or a data visualization engine at controller 18) may coalesce (e.g., aggregate or compile) the received packets to generate results to the user's query. Controller 18 may present the results to the user (e.g., in the form of a data file such as a database, table, graph, spreadsheet, as a graphical visualization, etc.) or may transmit the results to other computing equipment. In this way, controller 18 may present the data packets as part of a single coalesced result even if the data packets are retrieved from multiple different packet recorders Consider one illustrative example where the user has detected a security breach in production network 102 several days after the breach. The user may wish to analyze the security breach (e.g., to identify particular vulnerabilities of production network 102, to identify parties responsible for the breach, etc.) even though the breach took place several days prior. In order to analyze the breach, the user may generate a query for recorded packets associated with the breach. For example, the query may request packets recorded within a certain time frame (e.g., within the time frame of the breach several days prior), packets sent between end hosts associated with the breach, etc. Controller 18 may send a request (query) for the recorded packets associated with the breach to each of packet recorders 116. Packet recorders 116 may identify recorded packets associated with the breach, read those packets from packet storage, and may transmit those packets to controller 18. An analytics engine, visualization engine, or other circuitry at controller 18 may receive all of the read packets and may compile the packets into a coalesced result (e.g., controller 18 may order the data packets in the order with which they were conveyed through production network 102 or may present the packets in any desired manner). Controller 18 may present the result to the user to analyze the recorded packets to identify information about the security breach.

In another suitable arrangement, controller 18 may control the client switches to route the packets read from packet recorders 116 to traffic monitoring tools 112 (e.g., monitoring tool V1 of FIG. 12) for processing (monitoring). In this scenario, monitoring tools 112 may coalesce all of the packets from the different packet recorders into a single result and may analyze the result to identify the information about the security breach.

In some scenarios, it may be desirable to replay the recorded packets that have been read from packet recorders 116 over monitoring network 104. In replaying the recorded packets, monitoring network 104 may route the read packets to one or more traffic monitoring tools 112 in the same manner with which the packets were received by monitoring network 104 from production network 102. For example, the read packets may be conveyed to tools 112 in the same order and at the same times (e.g., data rates) with which they were received by monitoring network 104. This may, for example, allow tools 112 to replay the operation of production network 102 in real time, which may facilitate the analysis and monitoring of production network 102 by tools 112 (e.g., allowing monitoring tools 112 to replay a security breach in network 102 in real time to potentially identify temporal characteristics of the security breach that would otherwise be unresolvable).

Figure 16:
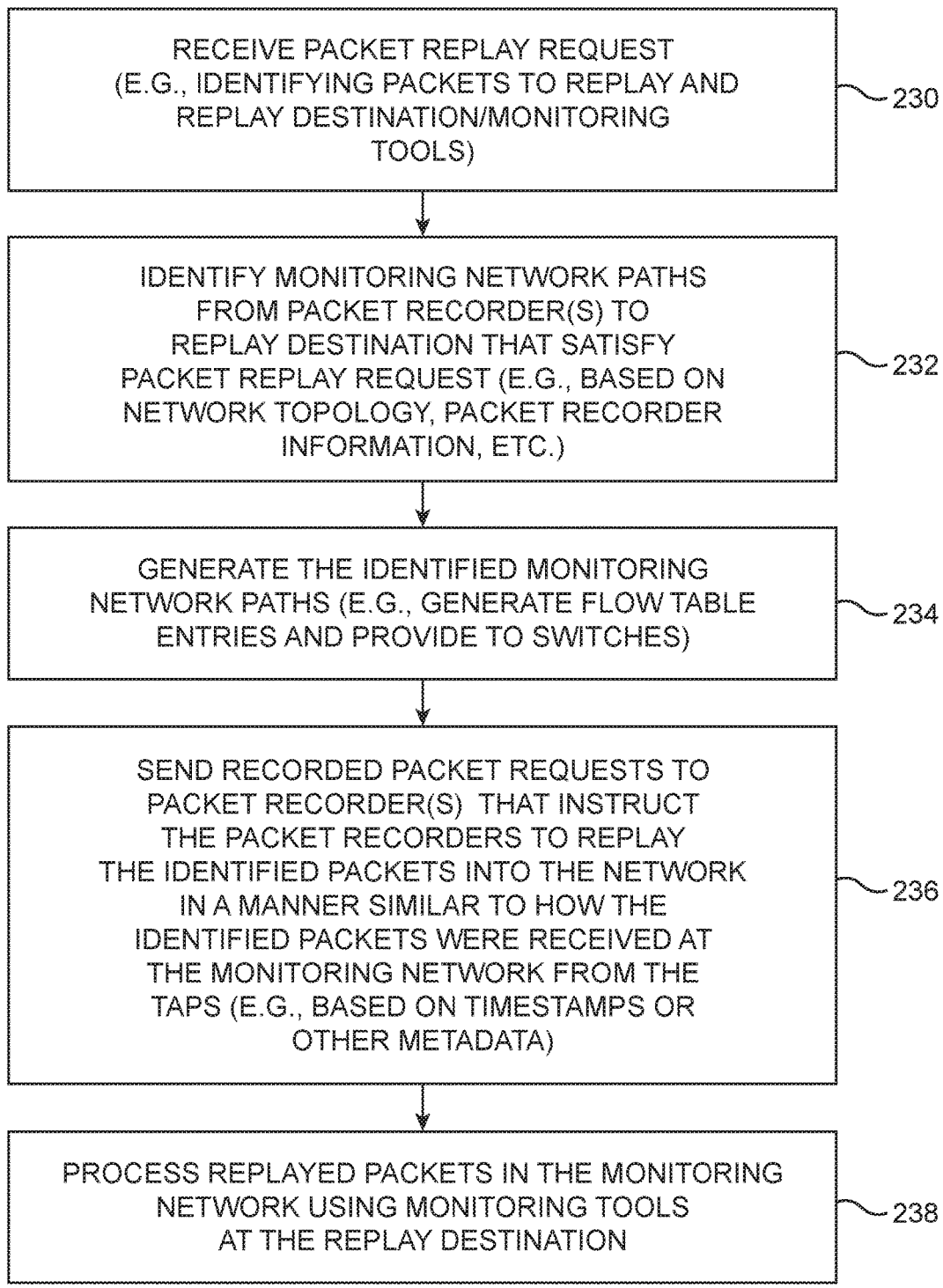
FIG. 16 is a flow chart of illustrative steps that may be involved in operating a controller of a traffic monitoring network to replay recorded network packets to traffic monitoring tools through the traffic monitoring network in accordance with an embodiment.

FIG. 16 is a flow chart of illustrative steps that may be performed by controller 18 in replaying recorded packets over monitoring network 104.

At step 230, controller 18 may receive a recorded packet replay request (e.g., as a part of a query for recorded packets). For example, controller 18 may receive the packet replay request from the user of monitoring network 104. The user may, for example, enter the packet replay request using input devices and/or software tools associated with controller 18, for example. In another suitable arrangement, the packet replay request may be generated autonomously (e.g., by software running at controller 18 or by other computing equipment coupled to controller 18). The packet replay request may, for example, identify particular sets of tapped packets that are recorded at packet recorders 116 that are to be replayed through monitoring network 104 to monitoring tools 112. The packet replay request may, if desired, specify particular packet recorders 116 at which the sets of tapped packets to be replayed are located. However, the user need not have knowledge of the packet recorder at which the sets of packets in the replay request are located. The sets of tapped packets that are to be read (e.g., the sets of tapped packets that are to be replayed into network 104) may, for example, be packets associated with events in production network 102 that the user desires to monitor (e.g., similar to those of the packet query defined in connection with FIG. 15). In addition to identifying packets to replay, the packet replay request may identify a particular monitoring tool 112 to replay the packets to (e.g., as a packet replay destination).

At step 232, controller 18 may identify paths in monitoring network 104 that satisfy the packet replay request and any other desired network policies associated with monitoring network 104. For example, controller 18 may identify paths such that desired sets of the tapped data are routed from one or more packet recorders 116 to a particular monitoring tool 112 based on information maintained at the controller such as network load and device capabilities to improve performance, to satisfy policy-defined requirements, or to satisfy any desired criteria.

At step 234, controller 18 may generate the paths identified during step 232. The controller may communicate with client switches 14 in generating the identified paths. For example, controller 18 may provide flow table entries that direct the client switches to forward and modify network packets matching the flow table entries along the desired network paths.

At step 236, controller 18 may send recorded packet requests to packet recorders 116 that instruct the packet recorders to replay the packets identified by the replay request into the network (e.g., in a manner similar to how the identified packets were received from tap paths 114). Controller 18 may send the recorded packet requests over control paths 66' of FIG. 12. Controller 18 may send the recorded packet requests to particular packet recorders identified by the packet replay request or may send the recorded packet requests to all packet recorders 116 in parallel.

Packet recorders 116 may read the packets identified by the packet replay request from packet storage. Packet recorders 116 may output the read packets into network 104 in a manner similar to how they were received from production network 102. For example, packet recorders 116 may process metadata 145 (FIG. 11) such as time stamp data and may use the time stamp data to output the packets at particular times. In this way, packets may be replayed into network 104 from one or more packet recorders at the same times and rates and in the same order with which they were received from production network 102. Client switches 14 may route the replayed packets to monitoring tool 112 or any other desired destination.

At step 238, monitoring tool 112 may process the replayed packets to monitor the past operation of production network 102. For example, in processing replayed packets, monitoring tool 112 may analyze temporal aspects of production network 102 that would otherwise be unavailable for processing.

If desired, a precision time protocol (PTP) may be used to ensure that the timing of each packet recorder 116 is synchronized to the sub-microsecond scale. This may, for example, allow the packet recorders to record the packets and replay the packets into monitoring network 104 with a high degree of timing precision. This may, for example, ensure that the replayed packets are received at traffic monitoring tools 112 in the correct order and at the correct times and speeds, even if the packets are read from multiple packet recorders 116.

In the example of FIG. 12, traffic monitoring tool V1 is connected to port P8 of switch SW5. In this scenario, traffic monitoring tool V1 may, for example, be located at the same geographical location as packet recorders 116 and monitoring network 104. This is merely illustrative. If desired, monitoring tool V1 may be implemented using computing equipment implemented on nodes in an external (remote) network such as nodes of a cloud services network.

Monitoring network switches 14 may continue to route tapped packets to packet recorders 116 and packet recorders 116 may continue to store tapped packets while controller 18 queries packets from packet recorders 116 (e.g., the steps of FIGS. 15 and 16 may be performed concurrently with the steps of FIG. 14). This may, for example, allow the user to query recorded packets without interrupting the packet recording capabilities of the monitoring network.

If desired, deep packet inspection (DPI) operations may be performed when the packets are recorded at packet recorders 116. However, results of the deep packet inspection may require a relatively high amount of storage capacity on the packet recorders. If a user desires DPI operations to be performed upon recording the packets, the user may specify as such in their packet recording policy. In this scenario, controller 18 may control packet recorders 116 to perform DPI operation and to transmit the results from the packet recorder (e.g., to controller 18 or elsewhere) for storage without being stored on packet recorder 116. This may, for example, conserve storage space within packet recorder 116.

Figure 17:
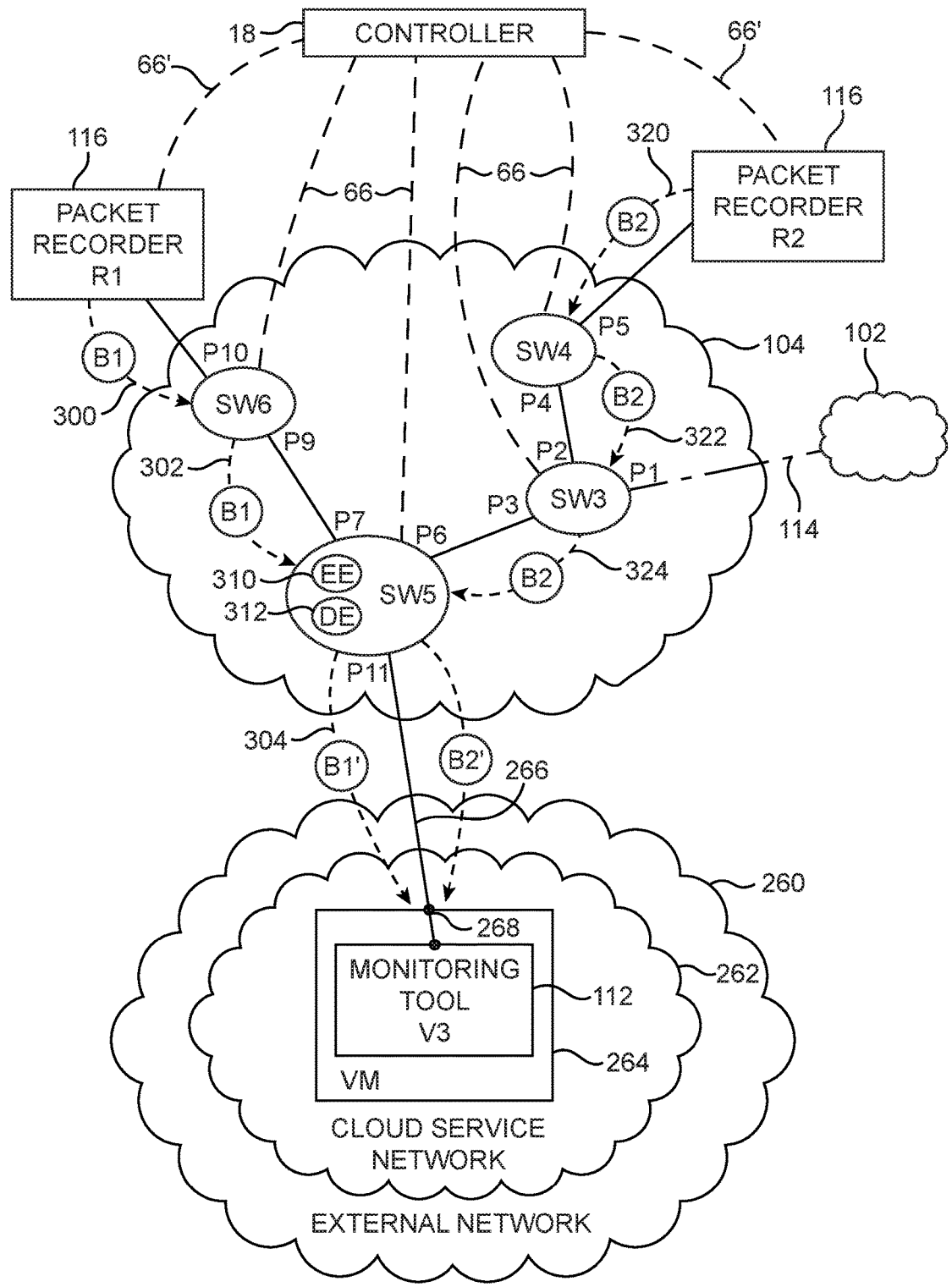
FIG. 17 is a diagram showing an example of how a traffic monitoring network may replay recorded packets through the traffic monitoring network to traffic monitoring tools implemented using cloud computing services in accordance with an embodiment.

FIG. 17 is an illustrative flow diagram showing one example of how controller 18 may control monitoring network 104 to perform recorded packet replay operations to a monitoring tool implemented on a cloud services network. In the example of FIG. 17, monitoring network 104 has only a single tap to production network 102 (e.g., over filter port P1 of switch SW3) for the sake of clarity.

As shown in FIG. 17, monitoring network 104 may be coupled to an external network 260 (e.g., a layer-3 (L3) network) such as the internet over link 266. A cloud computing system such as cloud service network 262 may be implemented on external network 260 (e.g., a distributed network of computing devices such as computers and servers that pool resources for data storage and processing operations using cloud computing techniques and algorithms). Cloud service network 262 may include a virtual machine (VM) such as virtual machine 264 (e.g., a virtual computer emulated using the resources of one or more physical computing devices in network 262). Virtual machine 264 may include one or more traffic monitoring tools 112 such as monitoring tool V3 for monitoring traffic in production network 102 (e.g., traffic monitoring tools 112 may be implemented using software running on virtual machine 264).

Monitoring tool V3 may interface with monitoring network 104 via virtual machine interface 268 and link 266. Link 266 may be implemented as a network tunnel between monitoring network 104 and cloud service network 262 (e.g., a network tunnel between a tunnel interface formed by port P11 of switch SW5 of monitoring network 104 and tunnel interface 268). Interfaces 268 and P11 may, for example, have corresponding addresses. Data that is conveyed over path 266 (sometimes referred to herein as network tunnel 266 or tunnel 266) may be encapsulated using a network tunneling protocol (e.g., an encapsulation protocol such as a L2GRE encapsulation protocol or other protocols) prior to being conveyed over path 266. The encapsulated packet may, for example, have a destination IP address field set to the IP address of interface 268. The data may be de-encapsulated using the network tunneling protocol upon arrival at interface P11 (from virtual machine 264) or upon arrival at interface 268 (from switch SW5).

FIG. 17 depicts one illustrative example of how packets may be replayed to monitoring tool V3 for monitoring traffic in production network 102. Consider a scenario where traffic in production network 102 is tapped over tap path 114 on a Saturday. The tapped traffic may be forwarded to port P1 on switch SW3 on Saturday. The tapped traffic may include a first set of the tapped packets B1 (sometimes referred to herein as packets B1) and a second set of the tapped packets B2 (sometimes referred to herein as packets B2) that arrive immediately after packets B1. Controller 18 may, for example, control the monitoring network 104 to forward tapped packets B1 to packet recorder R1 for storage and to forward tapped packets B2 to packet recorder B2 for storage (e.g., based on a packet recording policy specified by a network administrator of network 104 while processing step 202 of FIG. 14).

In this example, there may be a security breach in production network 102 associated with the sets of packets B1 and B2 on Saturday. This security breach may, for example, go un-noticed by the user of monitoring network 104 until Monday. Upon discovering that a security breach occurred, the user may wish to find information associated with the security breach. The user may also have access to a particular monitoring tool V3 on cloud service network 262 that will be able to identify information associated with the security breach if the packets associated with the security breach are replayed to the monitoring tools in real time (e.g., using the same time periods with which the packets originally traversed production network 102).

The network administrator may generate a packet replay request at controller 18 (e.g., while processing step 230 of FIG. 16). The packet replay request may request all packets associated with the security breach tapped by path 114 during a particular time frame (e.g., on Saturday). The packet replay request may also identify that the requested packets are to be replayed to monitoring tools 268 on cloud service network 262. Controller 18 may subsequently send a recorded packet request to all packet recorders 116 coupled to monitoring network 104 in parallel (e.g., over control paths 66').

Packet recorder R1 may receive the recorded packet request and may identify that recorded packets B1 match the packets identified by the packet request (e.g., that recorded packets B1 are associated with the security breach and arrived during the appropriate time frame). Similarly, packet recorder R2 may identify that the recorded packets B2 match the packets identified by the packet request. At the same time, controller 18 may provide flow table entries to the client switches of monitoring network 104 to establish the necessary network paths to monitoring tool V3 (e.g., while processing step 234 of FIG. 16).

Packet recorders R1 and R2 may replay the packets into network 104 in the same manner in which the packets were received at network 104 (e.g., based on time stamp information associated with the packets). For example, packet recorder R1 may identify that the packets B1 have particular time stamps and packet recorder R2 may identify that packets B2 have later time stamps. In replaying the packets B1 and packets B2, packet recorder R1 may first replay packets B1 into monitoring network 104 and packet recorder R2 may subsequently replay packets B2 into monitoring network 104.

For example, packet recorder R1 may send packets B1 to port P10 of switch SW6, as shown by arrow 300. Switch SW6 may match packets B1 onto corresponding flow table entries (e.g., as provided by controller 18 while processing step 234 of FIG. 16) having action fields that instruct switch SW6 to route packets B1 to switch SW5, as shown by arrow 302 (e.g., because switch SW5 is coupled to tunnel 266 and controller 18 knows that in order for matching packets received at switch SW6 to be routed to tunnel 266 the packets first need to be routed to switch SW5). Switch SW5 may match packets B1 onto corresponding flow table entries that instruct switch SW5 to send packets B1 to monitoring tool V3 over tunnel 266. In order to send packets B1 over tunnel 266, switch SW5 may encapsulate packets B1 using encapsulation engine 310 and a corresponding network tunneling protocol to generate encapsulated packets B1' (e.g., the matching flow table entries may instruct switch SW5 to encapsulate the packets). Switch SW5 may send encapsulated packets B1' to interface 268 of virtual machine 264 on cloud service network 262 over tunnel 266, as shown by arrow 304. Monitoring tool V3 on virtual machine 264 may receive encapsulated packets B1' and may de-encapsulate the packets for further processing.

Sometime after packets B1 have been transmitted by packet recorder R1 (e.g., once packets B1 have been received at switch SW6, at switch SW5, at virtual machine 264 or, more particularly, at a time corresponding to the timestamps of packets B2), packet recorder R2 may send packets B2 to port P5 of switch SW4, as shown by arrow 320. Switch SW4 may match packets B2 onto corresponding flow table entries that instruct switch SW6 to route packets B2 to switch SW2, as shown by arrow 322. Switch SW3 may match packets B2 onto corresponding flow table entries that instruct switch SW3 to route packets B2 to switch SW5. Switch SW5 may match packets B2 onto corresponding flow table entries that instruct switch SW5 to encapsulate packets B2 as encapsulated packets B2' and to forward encapsulated packets B2' to monitoring tool V3 over tunnel 266. Monitoring tool V3 on virtual machine 264 may receive encapsulated packets B2' and may de-encapsulate the packets for further processing.

In this way, monitoring tool V3 may receive packets B1 and B2 in the same manner (e.g., in the same order and with the same timing) with which those packets were conveyed through production network 102, arrived at monitoring network 102, and were recorded at packet recorders 116. This may allow monitoring tool V3 to monitor temporal aspects of the traversal of packets B1 and B2 through production network 102 to obtain a more accurate assessment of the corresponding event (e.g., a past security breach) in production network 102. If desired, monitoring tool V3 may transmit analysis results or other data to controller 18, monitoring network 104, or other hosts coupled to monitoring network 104 over tunnel 266 or other network paths. If desired, switch SW5 may include a de-encapsulation engine 312 for de-encapsulating encapsulated packets received over tunnel 266.

Figure 18:
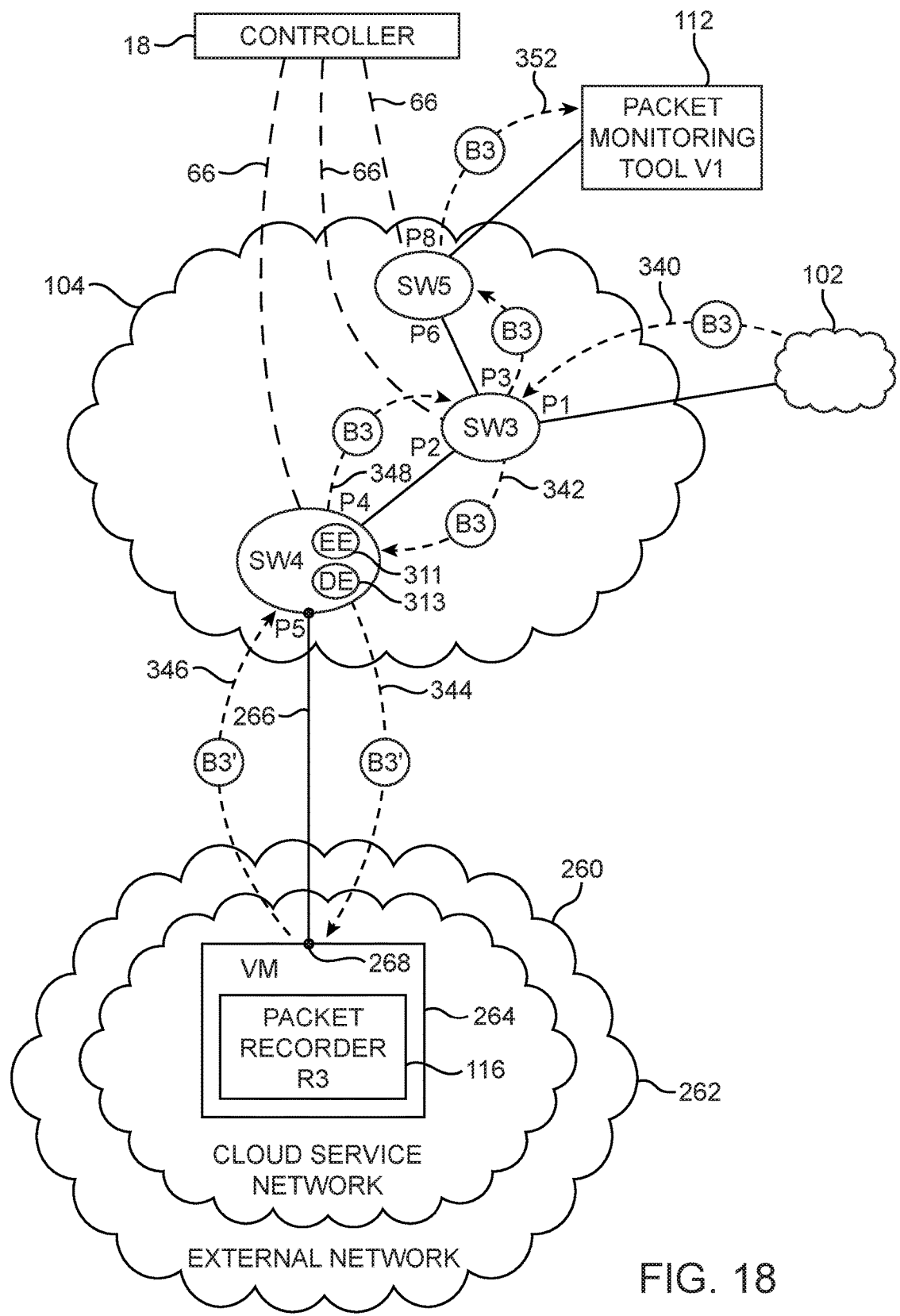
FIG. 18 is a diagram showing an example of how a traffic monitoring network may forward network packets from a production network to a packet recorder implemented using cloud computing services in accordance with an embodiment.

In another suitable arrangement, one or more packet recorders 116 may be implemented using cloud service network 262. FIG. 18 is a flow diagram of one illustrative example showing how a packet recorder 116 may be implemented using cloud service network 262. In the example of FIG. 18, monitoring network 104 has only a single tap to production network 102 (e.g., over filter port P1 of switch SW3) for the sake of clarity. Monitoring network 104 is coupled to a single monitoring tool V1 and a single packet recorder R3 in this example but in general, may be coupled to any desired number of monitoring tools and packet records in any desired arrangement.

A packet recorder 116 such as packet recorder R3 may be formed on virtual machine 264 of cloud service network 262 (e.g., packet recorder 116 may be implemented using software instance running on virtual machine 264 and the corresponding packet storage may be distributed across one or more underlying computing servers in cloud service network 262). Packet recorder 116 may interface with monitoring network 104 over tunnel interface 268 and tunnel 266. For example, tunnel 266 may be coupled to port P5 of switch SW4. Controller 18 may identify that packet recorder R3 is coupled to monitoring network 104 via port (attachment point or tunnel interface) P5 of switch SW4 (e.g., based on the network topology information maintained at controller 18).

In the example of FIG. 18, a user provides a packet recording policy to record a set of tapped packets such as packets B3. Controller 18 may control the client switches of monitoring network 104 to establish network paths from port P1 to packet recorder R3 (e.g., while processing step 206 of FIG. 14). Packet recorder R3 may be specified by the packet recording policy or may be unspecified by the packet recording policy. Using packet recorder R3 on cloud service network 262 may, for example, allow the network administrator to utilize packet recorder resources without having to purchase physical computing equipment to couple to monitoring network 104 for implementing the packet recorder.

When packets B3 are received at switch SW3, packets B3 may match on flow table entries on switch SW3 that instruct switch SW3 to route packets B3 to switch SW4 as shown by arrow 342. Packets B3 may match on flow table entries on switch SW4 that instruct switch SW4 to encapsulate packets B3 using encapsulation engine 311 to generate encapsulated packets B3' and to route encapsulated packets B3' to packet recorder R3 over tunnel 266. Packet recorder R3 may de-encapsulate the packets and maintain packets B3 in storage on cloud service resources 262.

In the example of FIG. 18, the user provides a packet replay request to controller 18 identifying that packets B3 are to be replayed to traffic monitoring tool V1 through monitoring network 104. Controller 18 may identify and establish network paths in monitoring network 104 between port P5 of switch SW4 and traffic monitoring tool V1 (e.g., while processing steps 232 and 234 of FIG. 16). Controller 18 may send a recorded packet request to packet recorder R3 (e.g., over a network control path). Upon receiving the recorded packet request, packet recorder R3 may read packets B3 from packet storage, may encapsulate the read packets B3 to generate encapsulated packets B3', and may transmit encapsulated packets B3' to monitoring network 104 via tunnel 266, as shown by path 346.

Switch SW4 may receive encapsulated packets B3' over port P5. Switch SW4 may de-encapsulate packets B3' using de-encapsulation engine 313 to recover packets B3. Packets B3 that were received over port P5 may, for example, match on flow table entries on switch SW4 that instruct switch SW4 to route packets B3 to switch SW3 as shown by arrow 348. Packets B3 received over port P2 of switch SW3 may match on flow table entries on switch SW3 that instruct switch SW3 to route packets B3 to switch SW5, as shown by arrow 350. Packets B3 may match on flow table entries on switch SW5 that instruct switch SW5 to route packets B3 to traffic monitoring tool V1, as shown by arrow 352. Traffic monitoring tool may subsequently perform any desired traffic monitoring operations on packets B3.

The examples of FIGS. 17 and 18 are merely illustrative. In general, any desired switches may be arranged in any desired manner in network 104 and recorders 116 and monitoring tools 112 may be coupled to any desired switches. Any desired number of monitoring tools 112 and recorders 116 may be used. Leveraging cloud network resources as in the examples of FIGS. 17 and 18 may, for example, allow the user of monitoring network 104 to implement monitoring network 104 without on-premises storage equipment for packet recorders and to access the elastic and efficient cost-performance benefits associated with the resources of cloud service network 262. The cloud resources may also allow a team of different users at different geographic locations to access the recorded packets and/or monitoring tools if desired.

In this way, monitoring network 104 may adaptively perform traffic monitoring for production network 102 by recording large volumes of entire packets on one or more packet recorders 116. The packet storage capacity of monitoring network 104 may be scaled up over time as needed and controller 18 may autonomously update its network topology information to track each of the packet recorders. By logically grouping each of the packet recorders coupled to monitoring network 104 and coalescing recorded packet queries from multiple packet recorders, controller 18 may allow a network administrator (user) to easily configure monitoring network 104 and monitor production network 102 without needing to program and interact with each packet recorder individually, even as the scale of monitoring network 104 and its corresponding packet storage capacity increases over time. In other words, controller 18 may provide a simple, cost-effective single pane-of-glass architecture to send/record, query, and/or replay packets from production network 102.

If desired, the same user interface equipment may be used to allow a user (e.g., network administrator) to both query recorded packets and view the results of the query (e.g., visualizations associated the packets that are used to monitor production network 102). FIG. 19 is an illustrative diagram showing how user interface equipment may be used to both query recorded packets and view visualizations of the results of the query.

As shown in FIG. 19, production network 102 may provide tapped packets to filter port 400 of monitoring network 104 over tap path 114. Controller 18 may include switch controller engine 19 (e.g., circuitry and/or software for maintaining network topology information and for generating and implementing network paths in monitoring network 104), analytics equipment 404, and user interface equipment 406. If desired, both the tapped packets themselves and metadata associated with the tapped packets (e.g., time information or other metadata) may be routed to analytics equipment 404 via path 402 (e.g., analytics equipment that does not serve as an end host of monitoring network 104). Analytics equipment 404 may be coupled to switch controller engine 19 via control path 66".

User interface equipment 406 may be coupled to analytics equipment 404 via path 408. Analytics equipment 404 may pass the metadata associated with the packets received at filter port 400 to query and visualization tools 412 on analytics interface equipment 406. User interface equipment 406 may be used to interface with (e.g., control and receive data from) analytics equipment 404, packet recorder 116, and/or switch controller engine 19. In other words, in this example, switch controller engine 19, analytics equipment 404, and interface 406 are all implemented on the same computing equipment (e.g., controller server 18) coupled to monitoring network 104. This is merely exemplary. If desired, two or more of equipment 404, 406, and 19 may be implemented on separate computers or servers (e.g., analytics equipment 404 and/or interface 406 need not be formed as a part of controller 18). User interface equipment 406 may include, for example, display equipment that displays a graphical user interface (e.g., one or more software dashboards) and input devices such as a keyboard and mouse for interacting with the graphical user interface.

Query and visualization tools 412 on user interface equipment 406 may, for example, include software and/or hardware tools that are used to both query recorded packets from packet recorder 116 for analysis and to display results of the query to a user. Controller 18 (e.g., query and visualization tools 412 and interface equipment 406) may be coupled to a dedicated query port 415 (sometimes referred to herein as query interface 415) on packet recorder 116 via control path 414 (e.g., path 66' of FIG. 12).

Query and visualization tools 412 may receive a query for a particular set of recorded packets from the user (e.g., while processing step 220 of FIG. 15) while the user interacts with a graphical user interface or dashboard associated with tools 412. Query and visualization tools 412 may generate a query control signal qry to query that particular set of recorded packets (e.g., control signal qry may be a recorded packet request as sent while processing step 222 of FIG. 15).

Control signal qry may include a set of five identifiers sometimes referred to herein as a five-tuple as well as a time duration. Query and visualization tools 412 may generate the five-tuple and time duration by performing an abstracted search over control packets (e.g., ARP packets, DHCP packets, DNS packets, ICMP packets, etc.) and/or derived characteristics of the packets themselves (e.g., information about whether flows are outgoing from a particular enterprise or between departments of a particular enterprise associated with production network 102). This abstracted search may, for example, be performed over the metadata associated with the packets received at filter port 400 that is received from analytics equipment 404. Performing the search over the metadata may require searching over significantly less data than searching over the whole data packets themselves, thereby allowing the packets of interest to be more quickly identified than when the search is performed over the entire data packets.

Packet recorder 116 may receive control signal qry over path 414 and may identify the queried packets based on the five-tuple and time duration in control signal qry. Packet recorder 116 may subsequently read the queried packets from packet storage and transmit the queried packets to query and visualization tools 412 over path 414. Query and visualization tools 412 may subsequently process the read packets and perform any desired network monitoring operations on the read packets. This may include, for example, displaying visualizations of production network 102 associated with the read packets. These operations may, for example, be associated with performing step 224 of FIG. 15. In addition, the read packets may be stored on a file locally (e.g., at storage circuitry such as memory associated with query and visualization tools 412) for later analysis using (network) analysis tools such as third party analysis tools (e.g., a Wireshark tool or other packet analysis tool). Such processing and visualization operations may include, for example, protocol analysis, network troubleshooting, or other packet-based network analysis operations.

If desired, packet recorder 116 may be coupled to analytics equipment 404 over path 410. If desired, packet recorder 116 may transmit the queried packets to analytics equipment 404 over path 410 (e.g., while processing step 224 of FIG. 15). Analytics equipment 404 may perform any desired analysis operations not performed by query and visualization tools 412, for example. In one suitable arrangement, analytics equipment 404 may perform analysis operations that are visualized using query and visualization tools 412.

By using the same tools 412 to both query recorded packets and visualize the results of the query, seamless workflow continuation from anomaly identification in production network 102 to packet study may be realized using computing equipment 18. If desired, a detailed study of the queried packets may be omitted by processing the metadata received from analytics equipment 404 (e.g., using window scaling factor or latencies in a three-way TCP handshake). This may, for example, allow for a deeper analysis of already-recorded packets, where the analysis results are fed back to a metadata database to be searchable in near real time.

Controller 18, packet recorder 116, and client switches 14 may be configured to perform the above-described operations (e.g., the operations of FIGS. 7-19) using hardware such as circuitry and/or software such as code that runs on hardware. Code for performing these operations may be stored on non-transitory computer readable storage media. The code may sometimes be referred to as data, software, program instructions, code, or instructions. The non-transitory computer readable storage media may include non-volatile memory, removable media such as one or more removable flash drives, one or more hard drives or disks, other computer readable media, or combinations of these or other storage. Code (software) stored on the non-transitory computer readable media may be executed by processing circuitry on controller 18, switches 14, and/or packet recorder 116 if desired. This processing circuitry may include central processing units (CPUs), integrated circuits such as application-specific integrated circuits with processing circuitry, microprocessors, or other processing circuitry.

The foregoing is merely illustrative of the principles of this invention and various modifications can be made by those skilled in the art without departing from the scope and spirit of the invention.

What is claimed is:

1. A method of using a controller that controls client switches in a monitoring network having network interfaces that are coupled to a packet forwarding network and that receive tapped network packets from the packet forwarding network, the method comprising:
   with the controller, receiving a packet recording policy that identifies a set of the tapped network packets to be recorded;
   with the controller, generating network paths that forward the set of tapped network packets from the network interfaces to a packet recorder through the client switches in the monitoring network for storage at the packet recorder;
   with the controller, sending a packet request to the packet recorder that instructs the packet recorder to transmit a subset of the set of tapped network packets back into the monitoring network; and
   with the controller, generating additional network paths that forward the subset of the set of tapped network packets from the packet recorder to a traffic analysis tool through the client switches in the monitoring network.

2. The method defined in claim 1, wherein the set of tapped network packets are stored at the packet recorder and wherein the controller is coupled to the packet recorder over a control path, the method further comprising:
   with the controller, querying an additional subset of the set of tapped network packets stored at the packet recorder over the control path; and
   with the controller, receiving the queried additional subset of the set of tapped network packets stored at the packet recorder over the control path.

3. The method defined in claim 2, wherein the packet recording policy identifies an additional set of the tapped network packets to be recorded, the method further comprising:
   with the controller, generating third network paths that forward the additional set of tapped network packets from the network interfaces to an additional packet recorder through the client switches in the monitoring network for storage at the additional packet recorder.

4. The method defined in claim 3, wherein the additional set of tapped network packets are stored at the additional packet recorder and wherein the controller is coupled to the additional packet recorder over an additional control path, the method further comprising:
   with the controller, querying a subset of the additional set of tapped network packets stored at the additional packet recorder over the additional control path in parallel with querying the additional subset of the set of tapped network packets stored at the packet recorder; and
   with the controller, receiving the queried subset of the additional set of tapped network packets stored at the additional packet recorder over the additional control path.

5. The method defined in claim 4, further comprising:
   with the controller, coalescing the additional subset of the set of tapped network packets received over the control path with the subset of the additional set of tapped network packets received over the additional control path to generate a graphical visualization associated with the packet forwarding network; and
   with display equipment associated with the controller, displaying the graphical visualization.

6. The method defined in claim 3, wherein generating the network paths and the third network paths comprises:
   generating flow table entries based on the received packet recording policy, a network policy, and network topology information associated with the monitoring network; and
   providing the flow table entries to the client switches of the monitoring network.

7. The method defined in claim 6, further comprising:
   with the controller, transmitting probe packets into the monitoring network;
   with the controller, identifying a new packet recorder that has been coupled to the monitoring network based on the transmitted probe packets; and
   with the controller, updating the network topology information based on the identified new packet recorder.

8. The method defined in claim 1, wherein the controller is coupled to the packet recorder over a control path and wherein the traffic analysis tool comprises a traffic visibility tool coupled to the monitoring network, the method further comprising:
   with the controller, receiving a packet replay request that identifies the subset of the set of tapped network packets, wherein the subset of the set of tapped network packets is stored at the packet recorder.

9. The method defined in claim 8, wherein the traffic visibility tool is implemented on a virtual machine of a cloud computing network and is coupled to the monitoring network over a tunnel interface at a given client switch of the monitoring network, and wherein the additional network paths forward the subset of the set of tapped network packets to the given client switch, the method further comprising:
   with the controller, controlling the given client switch to encapsulate the subset of the set of tapped network packets and to transmit the encapsulated subset of the set of tapped network packets over the tunnel interface.

10. The method defined in claim 8, wherein the packet recording policy identifies an additional set of the tapped network packets to be recorded, the method further comprising:
    with the controller, controlling the client switches to forward the additional set of tapped network packets from the network interfaces to an additional packet recorder through the client switches in the monitoring network for storage at the additional packet recorder, wherein the controller is coupled to the additional packet recorder over an additional control path, wherein the packet replay request identifies a subset of the additional set of tapped network packets, and wherein the subset of the additional set of tapped network packets is stored at the additional packet recorder;
with the controller, instructing the additional packet recorder to transmit the identified subset of the additional set of tapped network packets into the monitoring network; and
with the controller, controlling the client switches to forward the subset of the additional set of tapped network packets from the additional packet recorder to the traffic visibility tool through the client switches in the monitoring network.

11. The method defined in claim 1, wherein the controller is coupled to the packet recorder over a control path, the method further comprising:
with the controller, controlling the packet recorder to perform deep packet inspection (DPI) operations on the set of tapped network packets and to forward a result of the DPI operations to the controller over the control path without storing the results at the packet recorder.

12. A method of using a controller that controls client switches in a monitoring network having network interfaces that are coupled to a packet forwarding network and that receive tapped network packets from the packet forwarding network, the method comprising:
with the controller, identifying first and second sets of the tapped network packets to be recorded;
with the controller, generating first network paths that forward the first set of tapped network packets from the network interfaces to a first packet recorder through the client switches in the monitoring network for storage at the first packet recorder;
with the controller, generating second network paths that forward the second set of tapped network packets from the network interfaces to a second packet recorder through the client switches in the monitoring network for storage at the second packet recorder; and
with the controller, sending a packet request in parallel to both the first and second packet recorders that instructs the first and second packet recorders to identify a predetermined set of recorded packets and to transmit the predetermined set of recorded packets to the controller.

13. The method defined in claim 12, further comprising:
with the controller, controlling a given client switch in the monitoring network to generate a copy of the first set of tapped network packets; and
with the controller, generating third network paths that forward the copy of the first set of network packets to the second packet recorder through the client switches in the network for storage at the second packet recorder.

14. The method defined in claim 12, further comprising:
with the controller, receiving the predetermined set of recorded packets from the first and second packet recorders; and
with analysis equipment associated with the controller, analyzing the packet forwarding network based on the predetermined set of recorded packets received from the first and second packet recorders.

15. The method defined in claim 12, further comprising:
with the controller, sending a packet replay request in parallel to both the first and second packet recorders that instructs the first and second packet recorders to identify an additional predetermined set of recorded packets and to replay the additional predetermined set of recorded packets into the monitoring network based on timestamp information associated with the additional predetermined set of recorded packets.

16. The method defined in claim 15, further comprising:
with the controller, generating third network paths that forward at least some of the additional predetermined set of recorded packets from the first packet recorder to a network visibility tool coupled to the monitoring network through the client switches in the monitoring network; and
with the controller, generating fourth network paths that forward at least some of the additional predetermined set of recorded packets from the second packet recorder to the network visibility tool through the client switches in the monitoring network.

17. The method defined in claim 16, wherein generating the first, second, third, and fourth network paths comprises generating flow table entries and providing the flow table entries to the client switches in the monitoring network.

18. A method of operating computing equipment that controls client switches in a monitoring network having a filter port that is coupled to a packet forwarding network and that receives tapped network packets from the packet forwarding network, the method comprising:
with a switch controller engine on the computing equipment, identifying a set of the tapped network packets to be recorded;
with the switch controller engine, generating network paths that forward the set of tapped network packets from the filter port to a packet recorder device through the client switches in the monitoring network for storage at the packet recorder device, wherein the switch controller engine controls the client switches through a set of paths coupling a corresponding client switch in the client switches to the computing equipment; and
with query and visualization tools on the computing equipment:
receiving metadata associated with the set of tapped network packets,
receiving a query for a subset of the set of tapped network packets,
generating a control signal based on the received query and the received metadata,
providing the control signal from the query and visualization tools to a query port on the packet recorder device through an additional path coupling the packet recorder device to the computing equipment, wherein the additional path is separate from the set of paths,
receiving the subset of the set of tapped network packets from the query port of the packet recorder device, and
displaying a graphical visualization associated with the received subset of the set of tapped network packets on display equipment and saving the received subset of the set of tapped network packets in a file stored at the computing equipment for analysis using a packet analysis tool.

19. The method defined in claim 18, wherein the control signal comprises a five-tuple and a time duration associated with the subset of the set of tapped network packets.

20. The method defined in claim 18, further comprising:
with analytics equipment coupled between the switch controller engine and the query and visualization tools and implemented on the computing equipment, passing the metadata associated with the set of tapped network packets from the filter port to the query and visualization tools.

* * * * *